US011155233B2

(12) United States Patent
Yanagisawa et al.

(10) Patent No.: US 11,155,233 B2
(45) Date of Patent: Oct. 26, 2021

(54) COMPLETELY FOLDED BODY OF AIRBAG AND FOLDING METHOD FOR SAME

(71) Applicant: TOYODA GOSEI CO., LTD., Kiyosu (JP)

(72) Inventors: Toshihito Yanagisawa, Kiyosu (JP); Takanori Komatsu, Kiyosu (JP); Hideo Higashi, Kiyosu (JP); Akira Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 40 days.

(21) Appl. No.: 16/839,461

(22) Filed: Apr. 3, 2020

(65) Prior Publication Data

US 2020/0346609 A1 Nov. 5, 2020

(30) Foreign Application Priority Data

May 2, 2019 (JP) .............................. JP2019-087176

(51) Int. Cl.
*B60R 21/237* (2006.01)
*B60R 21/203* (2006.01)

(52) U.S. Cl.
CPC .......... *B60R 21/237* (2013.01); *B60R 21/203* (2013.01); *B60R 2021/2375* (2013.01)

(58) Field of Classification Search
CPC ................ B60R 21/237; B60R 21/203; B60R 2021/2375
See application file for complete search history.

(56) References Cited

U.S. PATENT DOCUMENTS

| 6,224,100 | B1* | 5/2001 | Kamano | ............... B60R 21/237 280/728.1 |
| 6,485,403 | B2* | 11/2002 | Kamano | ............... B60R 21/217 280/728.1 |
| 6,726,615 | B1* | 4/2004 | Lang | ..................... B60R 21/237 493/405 |
| 6,994,664 | B2* | 2/2006 | Nishijima | ............. B60R 21/237 493/449 |
| 7,665,765 | B2* | 2/2010 | Yokoyama | ............ B60R 21/237 280/743.1 |

(Continued)

FOREIGN PATENT DOCUMENTS

| JP | 2002-144993 A | 5/2002 |
| JP | 2017-128279 A | 7/2017 |

*Primary Examiner* — Faye M Fleming
(74) *Attorney, Agent, or Firm* — Posz Law Group, PLC

(57) ABSTRACT

A completely folded body of an airbag, includes: an outer peripheral wall including a vehicle body side wall portion, and a receiving side wall portion. An outer peripheral edge side in a state where the receiving side wall portion is superimposed on the vehicle body side wall portion and is flatly deployed is subjected to radial folding and folded. An accommodation recess portion for accommodating an upper portion on a gas supply port side of an inflator is provided on a bottom surface. A radially-folded folded portion is disposed so as to surround a circumference of an intermediate portion from a base portion near the center of the ceiling surface of the accommodation recess portion in a linear supply path, for supplying the inflation gas from the inflator, to a tip portion disposed on an inner surface side near the center of the receiving side wall portion.

4 Claims, 21 Drawing Sheets

(56) References Cited

U.S. PATENT DOCUMENTS

| | | |
|---|---|---|
| 2001/0028165 A1 | 10/2001 | Nishijima et al. |
| 2002/0052284 A1 | 5/2002 | Nishijima et al. |
| 2002/0053791 A1 | 5/2002 | Nishijima et al. |
| 2002/0084634 A1* | 7/2002 | Adomeit ............... B60R 21/203 |
| | | 280/731 |
| 2003/0171200 A1 | 9/2003 | Nishijima et al. |
| 2005/0209080 A1 | 9/2005 | Nishijima et al. |
| 2017/0210331 A1 | 7/2017 | Komatsu et al. |

\* cited by examiner

V-V CROSS-SECTIONAL VIEW

COMPLETELY FOLDED BODY OF AIRBAG AND FOLDING METHOD FOR SAME

CROSS-REFERENCE TO RELATED APPLICATION(S)

This application is based upon and claims the benefit of priority from prior Japanese patent application No. 2019-087176 filed on May 2, 2019, the entire contents of which are incorporated herein by reference.

BACKGROUND

1. Field of the Invention

The invention relates to a completely folded body of an airbag which is used in an airbag device mounted on a vehicle and can receive and protect a person to be protected when inflation is completed, and a folding method for the same.

2. Description of the Related Art

In a related art, in an airbag of this type of airbag device, an outer peripheral wall includes a vehicle body side wall portion (also referred to as a lower panel) with an inflow opening of inflation gas and a receiving side wall portion (also referred to as an upper panel, an occupant side wall portion, or a driver side wall portion) which is connected to an outer peripheral edge of the vehicle body side wall portion, is disposed so as to cover the inflow opening, and receives a person to be protected (for example, see JP-A-2002-144993 and JP-A-2017-128279). When such an airbag is mounted on a vehicle as an airbag device, the airbag is folded into a completely folded body. Further, the completely folded body is formed by folding using radial folding which provides a folded portion in which an outer peripheral edge side in a state where the receiving side wall portion is superimposed on the vehicle body side wall portion and is flatly deployed is gathered around or above the inflow opening.

In addition, the completely folded body is provided with an accommodation recess portion near the center of a bottom surface to accommodate an upper portion on the gas supply port side in the inflator which supplies the inflation gas. The accommodation recess portion is formed to extend in a long cylindrical shape from the bottom surface of the completely folded body to the inside near the center of the receiving side wall portion on an upper surface side (see JP-A-2002-144993). Alternatively, the accommodation recess portion is formed near the center of the bottom surface of the completely folded body as a short cylindrical recess portion capable of accommodating only a vicinity of the upper portion of the inflator.

However, in the completely folded body of the airbag described in JP-A-2002-144993, a radially-folded folded portion is disposed so as to surround a circumference of the long cylindrical accommodation recess portion and only a portion near the center of the receiving side wall portion is disposed on a ceiling surface side of the accommodation recess portion. Therefore, at the initial stage of inflow of the inflation gas, the upward projection near the center of the receiving side wall portion is favorable, but the elimination of folding at the radially-folded folded portion is insufficient. In the completely folded body described in JP-A-2017-128279, the radially-folded folded portion is disposed so as to cover the circumference and the upper side of the cylindrical accommodation recess portion having a short length. Thus, the deployment of the radially-folded folded portion is favorable. However, there is room for improvement in that at the initial stage of the inflow of the inflation gas, the upward deployment near the center of the receiving side wall portion is made faster. That is, in the completely folded body of the related art, there is a problem in that both the upward deployment near the center of the receiving side wall portion and the elimination of the folding of the radially-folded folded portion are performed quickly.

SUMMARY

The invention solves the problems described above and an object thereof is to provide a completely folded body of an airbag and a folding method for the same, which can quickly perform both upward projection near a center of a receiving side wall portion at an initial stage of inflow of inflation gas and elimination of folding of a radially-folded folded portion.

According to an aspect of the invention, there is provided a completely folded body of an airbag, including: an outer peripheral wall including a vehicle body side wall portion with an inflow opening of inflation gas, and a receiving side wall portion which is connected to an outer peripheral edge of the vehicle body side wall portion, is disposed so as to cover the inflow opening, and receives a person to be protected, wherein: an outer peripheral edge side in a state where the receiving side wall portion is superimposed on the vehicle body side wall portion and is flatly deployed is subjected to radial folding to be gathered above the inflow opening and folded; an accommodation recess portion for accommodating an upper portion on a gas supply port side of an inflator which supplies inflation gas is provided near a center of a bottom surface; a linear supply path which is linearly extended from a vicinity of a center of a ceiling surface of the accommodation recess portion to an inner surface near a center of the receiving side wall portion disposed on an upper surface side and is capable of supplying the inflation gas from the inflator to the inner surface near the center of the receiving side wall portion is formed; and a radially-folded folded portion is disposed so as to cover a lateral side and an upper side around the accommodation recess portion and is disposed so as to surround a circumference of an intermediate portion from a base portion near the center of the ceiling surface of the accommodation recess portion in the linear supply path to a tip portion disposed on an inner surface side near the center of the receiving side wall portion.

In the completely folded body of the airbag according to the invention, the accommodation recess portion is filled with the inflation gas at the initial stage of the inflow of the inflation gas and the inner peripheral surface of the accommodation recess portion is pressed. In this case, some inflation gas flows quickly and linearly from the base portion of the linear supply path to the tip portion through the intermediate portion and reaches the inner surface near the center of the receiving side wall portion where the tip portion is located. Therefore, the area near the center of the receiving side wall portion is quickly pushed up and promptly deployed. In addition, the portion around the linear supply path in the ceiling surface of the accommodation recess portion, that is, the radially-folded folded portion is also pushed up by the inflation gas, quickly protrudes from the accommodation portion of the completely folded body, and can be deployed while eliminating folding.

Therefore, in a case of the completely folded body of the airbag according to the invention, both the upward projection near the center of the receiving side wall portion at the initial stage of the inflow of inflation gas and the elimination of folding of the radially-folded folded portion can be quickly performed.

According to the completely folded body corresponding to the above aspect, a fold portion, which is formed by folding a peripheral edge near the center of the receiving side wall portion below a portion near the center of the receiving side wall portion and toward the intermediate portion side of the linear supply path, may be disposed in a vicinity of the center on an upper surface side, and a tip portion of the linear supply path may be disposed on a surface side of the upper surface as a plate-like portion which is flatly deployed from the intermediate portion toward an upper side of the fold portion.

In such a configuration, the tip portion of the linear supply path is disposed on the surface side of the upper surface of the completely folded body so as to be exposed over a wide area as a flat-deployed plate-like portion. Therefore, at the initial stage of the inflow of the inflation gas, the inflation gas which has passed through the linear supply path flows into the plate-like portion of the tip portion of the linear supply path and causes a portion around the center of the receiving side wall portion to be quickly protruded as a wide and flat portion, and further, the folding of the fold portion is eliminated. As a result, the fold portion can be widely deployed. Therefore, in this airbag, a person to be protected that has been approached can be received over the flat wide area and can be suitably protected.

According to another aspect of the invention, there is provided a folding method for a completely folded body of an airbag, wherein: an outer peripheral wall of the airbag includes a vehicle body side wall portion with an inflow opening of inflation gas and a receiving side wall portion which is connected to an outer peripheral edge of the vehicle body side wall portion, is disposed so as to cover the inflow opening, and receives a person to be protected; in the completely folded body of the airbag, an outer peripheral edge side in a state where the receiving side wall portion is superimposed on the vehicle body side wall portion and is flatly deployed is formed by being folded using radial folding to be gathered above the inflow opening, and an accommodation recess portion is provided near a center of a bottom surface to accommodate an upper part of an inflator which supplies inflation gas on a gas supply port side; a linear supply path, which is linearly extended from a vicinity of a center of a ceiling surface of the accommodation recess portion to an inner surface near a center of the receiving side wall portion disposed on an upper surface side and is capable of supplying the inflation gas from the inflator to the inner surface near the center of the receiving side wall portion is provided; a radially-folded folded portion is disposed on a lateral side and an upper side around the accommodation recess portion and is disposed so as to surround a circumference of an intermediate portion from a base portion near the center of the ceiling surface of the accommodation recess portion in the linear supply path to a tip portion disposed on an inner surface side near the center of the receiving side wall portion; and when performing radial folding, the radial folding is performed in a state where a rod member for forming a linear supply path, which lifts the inner surface near the center of the receiving side wall portion, is inserted through the inflow opening, and the rod member is pulled out and a trace of pulling out the rod member is formed as the linear supply path.

In the folding method of a completely folded body of an airbag according to the invention, in a state where the rod member for forming a linear supply path is inserted from the inflow opening in an initial deployed body of the airbag which is flatly deployed by overlapping the receiving side wall portion on the vehicle body side wall portion and the vicinity of the center of the receiving side wall portion is lifted, the radial folding in which the outer peripheral edge of the initial deployed body is gathered above the inflow opening is performed, and when the rod member is pulled out, the linear supply path formed of the trace of pulling out of the rod member can be formed at the center of the radially-folded folded portion. That is, in the folding method of the invention, the completely folded body having the linear supply path at the center can be easily formed.

According to the folding method corresponding to the above aspect, when radially folding is performed such that an outer peripheral edge side in a state where the receiving side wall portion is superimposed on the vehicle body side wall portion and is flatly deployed is gathered above the inflow opening, the radially folding may be performed by pushing a large number of pushing jigs radially arranged around the inflow opening into the inflow opening side, and at the time of the pushing-in, sequentially pushing-in a plurality of groups which are displaced in a circumferential direction of the inflow opening, and the radially folding may be performed by pulling out the rod member for forming a linear supply path which is inserted before pushing-in after pushing-in a pushing jig of a first group of the first time, and then pushing-in a pushing jig of a subsequent group.

In such a folding method, the trace of pulling out the rod member is further compressed by the pushing jig together with the outer peripheral surface of the completely folded body, so that the outer diameter dimension of the completely folded body can be made smaller.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
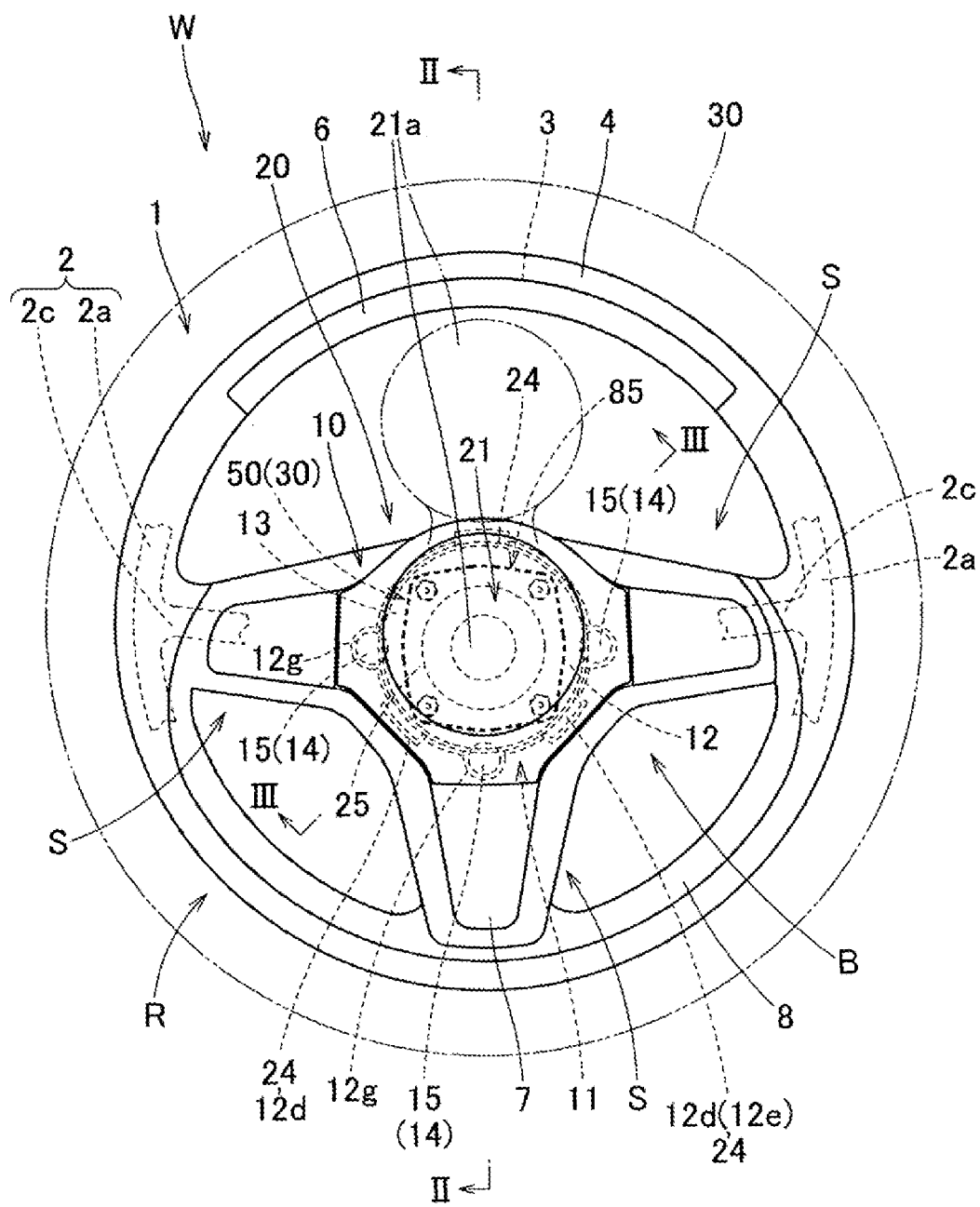
FIG. 1 is a schematic plan view of a steering wheel equipped with an airbag device using a completely folded body of an airbag according to a first embodiment of the invention.
Figure 2:
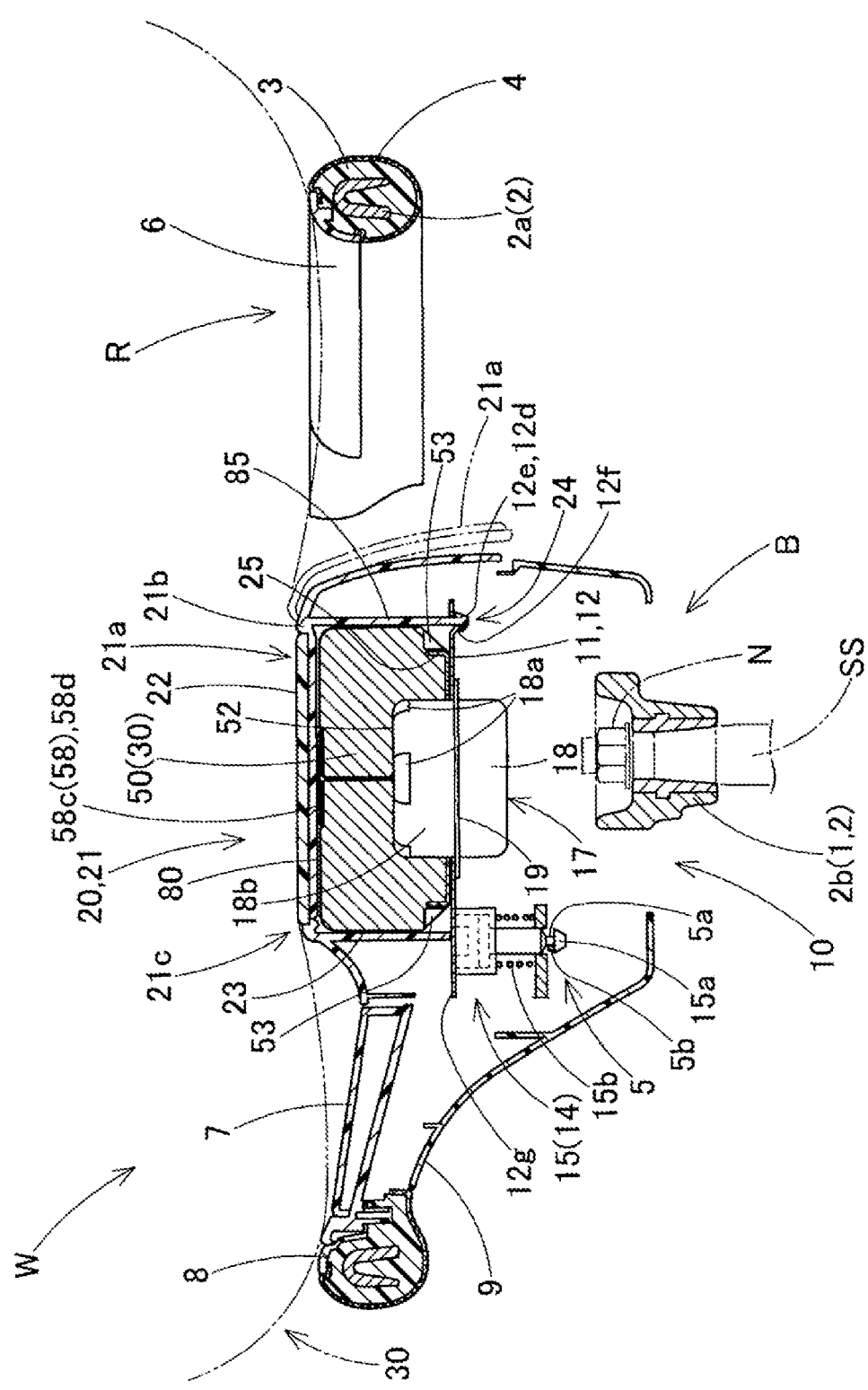
FIG. 2 is a schematic longitudinal cross-sectional view of the steering wheel equipped with the airbag device according to the first embodiment and corresponds to a portion II-II in FIG. 1.
Figure 3:
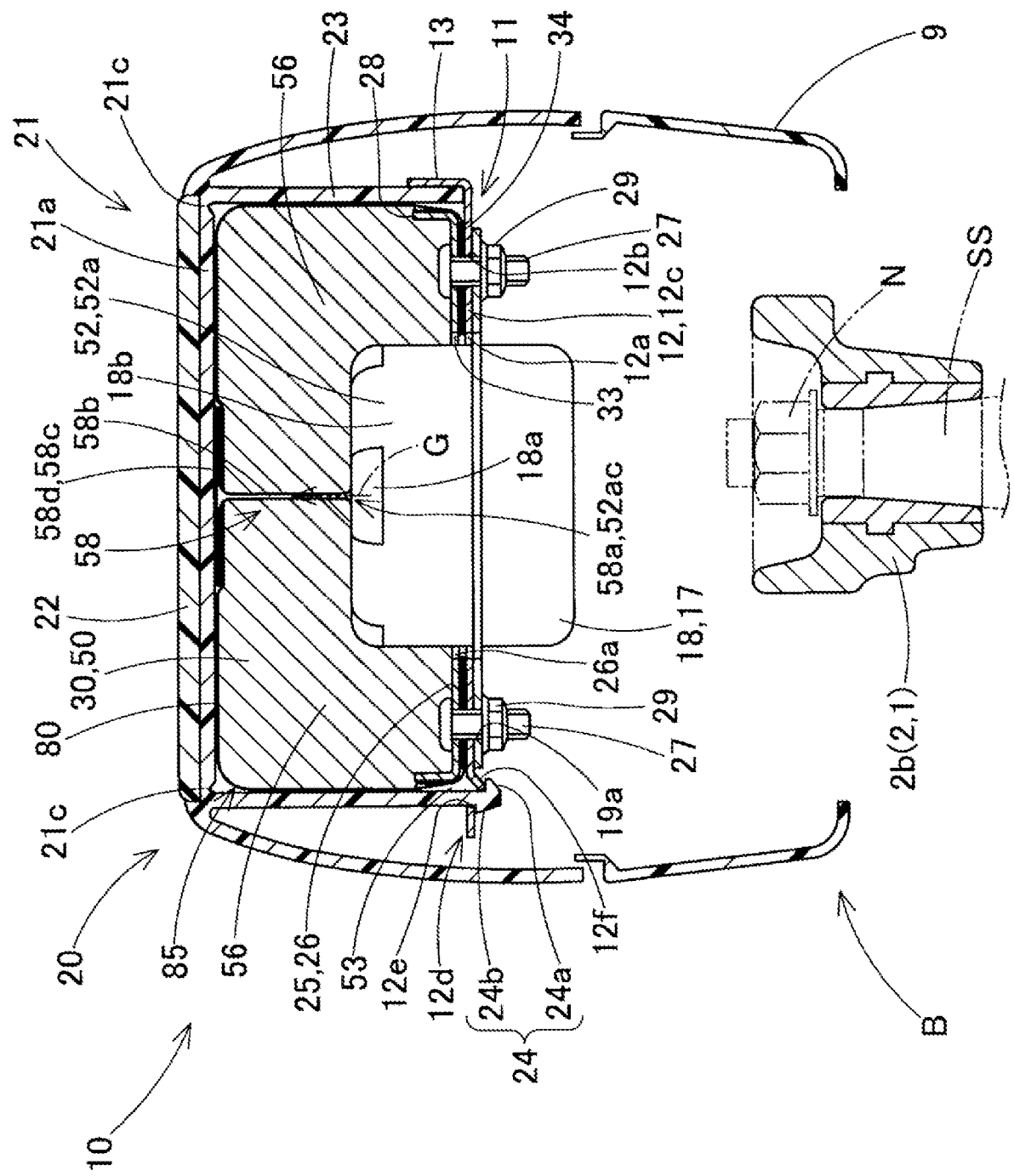
FIG. 3 is a schematic longitudinal cross-sectional view of the steering wheel equipped with the airbag device according to the first embodiment and corresponds to a portion in FIG. 1.

Hereinafter, a first embodiment of the invention will be described with reference to the drawings. As illustrated in FIGS. 1 to 3, a completely folded body 50 obtained by folding an airbag 30 according to the first embodiment is used for an airbag device 10 for a driver's seat which is attached and fixed to a boss portion B of a steering wheel W. The steering wheel W includes a steering wheel main body 1 having an annular ring portion R gripped during steering, the boss portion B disposed at the center of the ring portion R, and a spoke portion S connecting the ring portion R and the boss portion B and the airbag device 10 disposed above the boss portion B.

Regarding the up-down, right-left, and front-rear directions of the airbag device 10, the completely folded body 50 (airbag 30), the steering wheel W, and the like in this specification, based on the straight steering of the vehicle in a state where the steering wheel W is connected to a steering shaft SS of a vehicle by fastening a nut N, the up-down direction corresponds to an up-down direction along an axial direction of the steering shaft SS, the right-left direction corresponds to a right-left direction of the vehicle in a direction orthogonal to an axis of the steering shaft SS, and the front-rear direction corresponds to a front-rear direction of the vehicle in a direction orthogonal to the axis of the steering shaft SS.

The spoke portion S of the steering wheel W of the first embodiment is configured as three portions provided right and left sides and rear side of the boss portion B. The steering wheel main body 1 includes a core metal 2 disposed to interconnect the ring portion R, the boss portion B, and the spoke portion S and a coating layer 3 made of urethane or the like which covers the ring portion R and a portion of the core metal 2 of the spoke portion S near the ring portion R. A leather 4 is wound around the surface of the coating layer 3. Further, decorative garnishes 6 and 8 are provided on the inner peripheral sides of the front and rear portions of the ring portion R.

The core metal 2 includes a ring core metal portion 2a disposed in the ring portion R, a boss core metal portion 2b disposed in the boss portion B and connected to the steering shaft SS, and spoke core metal portions 2c disposed on the right and left spoke portions S and connecting the ring core metal portion 2a and the boss core metal portion 2b. In a case of the first embodiment, the spoke core metal portion 2c is disposed only at the front right and left two spoke portions S and a bezel 7 is disposed in a rear spoke portion so as to cover a rear side of an airbag cover (pad) 20 described below.

A fixing portion 5 for fixing each assembly pin 15a of a horn switch mechanism 14 of the airbag device 10, which will be described below, is disposed at the peripheral edge of the boss core metal portion 2b of the core metal 2. The fixing portion 5 is a fixing part for attaching the airbag device 10 to the steering wheel W. The fixing portion 5 is formed by arranging a locking hole 5a penetrating in a tapered shape narrowed downward and a locking pin 5b which is disposed on the lower surface side of the boss core metal portion 2b and locks the tip (lower end) of the assembly pin 15a. The locking pin 5b is formed of a spring material which can be bent along the lower surface of the boss core metal portion 2b so as to be restored.

Further, the steering wheel main body 1 is configured by disposing a lower cover 9 on the lower surface side of the boss portion B.

The airbag device 10 includes a substantially cylindrical completely folded body 50 obtained by folding the airbag 30, an inflator 17 for supplying inflation gas to the airbag 30, the airbag cover (pad) 20 made of synthetic resin which covers the completely folded body 50 and is disposed on the upper surface side of the boss portion B, a bag holder (case) 11 made of metal which holds and accommodates the completely folded body 50 (airbag 30) for mounting the completely folded body 50 on the boss portion B of the steering wheel W, and a wrapping material 80 which wraps the completely folded body 50 so as not to be collapsed. The bag holder 11 is a part for accommodating the completely folded body 50 by attachment and fixation and is also a part for holding the inflator 17 and the airbag cover 20.

In a case of the first embodiment, in the completely folded body 50 obtained by folding the airbag 30, a sheet metal-made square annular retainer 25 for attaching and fixing the airbag 30 to the bag holder 11 is provided inside a bottom surface 51 side (see FIGS. 2, 3, 6, and 17). The airbag 30 is pre-folded in a state where the retainer 25 is assembled and is formed into a folding preparation body 44 (see FIGS. 8A to 9) as an initial deployed body for radial folding. Next, the airbag 30 is radially folded and folded into a pre-folded body 49 (see FIGS. 10A to 11B), and further shaped into a substantially cylindrical completely folded body 50 having an accommodation recess portion 52 (see FIGS. 12 to 15). Then, the airbag 30 is wrapped in the wrapping material 80 to form a bag assembly body 85 (see FIGS. 16 and 17), which is attached and fixed to the bag holder 11.

As illustrated in FIGS. 2 and 3, the inflator 17 includes a cylindrical main body portion 18 and a square annular flange portion 19 is protruded from an outer peripheral surface of the main body portion 18. The flange portion 19 is formed with a through-hole 19a through which a bolt 27 of the retainer 25 described below passes. A plurality of gas supply ports 18a for discharging inflation gas G are provided on an upper portion 18b side of the main body portion 18 which is located above the flange portion 19.

As illustrated in FIGS. 1 to 3, the airbag cover 20 is made of a synthetic resin such as an olefin-based thermoplastic elastomer (TPO) and is disposed on the upper surface side of the boss portion B near the center of the steering wheel W. The airbag cover 20 includes a ceiling wall portion 21 which covers the upper part of the completely folded body 50 folded and accommodated inside the boss portion B and a side wall portion 23 extending in a substantially cylindrical shape from the lower surface of the ceiling wall portion 21 and covering a side surface (outer peripheral surface) 55 of the substantially cylindrical completely folded body 50.

A disc-shaped door portion 21a which is pushed by the inflating airbag 30 and opens forward is provided on the ceiling wall portion 21. The door portion 21a is provided with a hinge portion 21b on the front edge side and a thin breakage-scheduled portion 21c having a substantially circular arc shape when viewed from above is provided around the hinge portion 21b.

In a case of the first embodiment, a substantially disc-shaped ornament 22 made of synthetic resin is fixed to the upper surface of the door portion 21a. When the door portion 21a opens, the ornament 22 rotates integrally with the door portion 21a.

As illustrated in FIGS. 1 to 3, in the side wall portion 23 of the airbag cover 20, locking leg portions 24 coupled to the bag holder 11 are arranged at three places on the front side and the right and left diagonally rear sides. Each locking leg portion 24 is protruded from the lower end surface of the side wall portion 23 so as to extend downward. Further, the locking leg portion 24 is inserted through the locking hole 12e of the bag holder 11 and locked to the peripheral edge of the locking hole 12e. As illustrated in FIG. 3, the locking leg portion 24 includes an inner protrusion 24a protruding toward the inner peripheral surface of the side wall portion 23 and an outer protrusion 24b protruding toward the outer peripheral surface side of the side wall portion 23. The inner protrusion 24a is locked by a tongue piece portion 12f which is bent and deformed after the locking leg portion 24 is inserted into the locking hole 12e. Next, the locking leg portion 24 is pressed by the tongue piece portion 12f and the outer protrusion 24b is locked at the peripheral edge of the outer edge side of the locking hole 12e which is away from the inflator 17. Therefore, the airbag cover 20 is locked to the bag holder 11 while being prevented from pulling out upward.

Further, the side wall portion 23 has a configuration in which the lower end surface between the locking leg portions 24 and 24 is allowed to abut on a base plate portion 12 of the bag holder 11. Further, since the side wall portion 23 is restricted from moving upward from the bag holder 11 by the locking leg portion 24, the airbag cover 20 is attached and fixed to the bag holder 11 with restricted vertical movement and front-back and right-left movement.

The bag holder 11 is made of sheet metal and holds the completely folded body 50, the inflator 17, and the airbag cover 20, as illustrated in FIGS. 1 to 3. Further, the bag holder 11 is configured as a sheet metal member which attaches the airbag device 10 to the steering wheel main body 1 using a switch body 15. The bag holder 11 includes the substantially annular base plate portion 12 and a side wall supporting portion 13 protruding upward from the outer peripheral edge of the base plate portion 12.

In the base plate portion 12, on the front side and the right and left diagonally rear sides, locking portions 12d configured by penetrating the locking hole 12e provided with the tongue piece portion 12f are arranged. In addition, the base plate portion 12 is provided with a substantially semi-disc-shaped switch support portion 12g for fixing each switch body 15 on the rear side and on both right and left sides. The side wall supporting portion 13 is disposed on the outer peripheral surface side of the side wall portion 23 of the airbag cover 20 in the position between the locking portion 12d and the switch support portion 12g. The side wall supporting portion 13 regulates the deformation such as inflation of the side wall portion 23 when the airbag 30 is inflated.

Further, in the center of the base plate portion 12, a substantially circular insertion hole 12a capable of inserting the main body portion 18 of the inflator 17 from below is open corresponding to an inflow opening 33 of the airbag 30, and four through-holes 12b through which respective bolts 27 of the retainer 25 pass are formed at the peripheral edge of the insertion hole 12a. A portion at the peripheral edge of the insertion hole 12a where the through-hole 12b is provided becomes an attaching seat 12c for attaching the completely folded body 50 and the inflator 17 using the retainer 25.

The three switch bodies 15 arranged in respective switch support portions 12g form the floating-type horn switch mechanism (horn switch) 14 of the steering wheel W. Each switch body 15 is biased upward by a coil spring 15b, as illustrated in FIG. 2, and the upward biasing position of each switch body 15 is regulated by the assembly pin 15a which is locked and prevented from pulling out upward with respect to the fixing portion 5 of the core metal 2. Further, when operating the horn switch mechanism (horn switch) 14, if the airbag device 10 is pressed, a movable contact point on the switch support portion 12g side in the switch body 15 approaches a fixed contact point on the assembly pin 15a side and comes in contact with the fixed contact point. Therefore, the horn operation circuit is energized to operate the horn.

Specifically, when pressing down a portion near the center of the ceiling wall portion 21 of the airbag cover 20, the ceiling wall portion 21 abuts on an upper surface 54 of the completely folded body 50 having a shape retaining property capable of supporting the ceiling wall portion 21 and pushes the completely folded body 50 downward. Next, the bag holder 11 with which a bottom surface 51 of the completely folded body 50 moving downward is in contact is lowered. Therefore, the bag holder 11 lowers the movable contact point of each switch body 15 together with the base plate portion 12 to operate the horn.

Figure 5A:
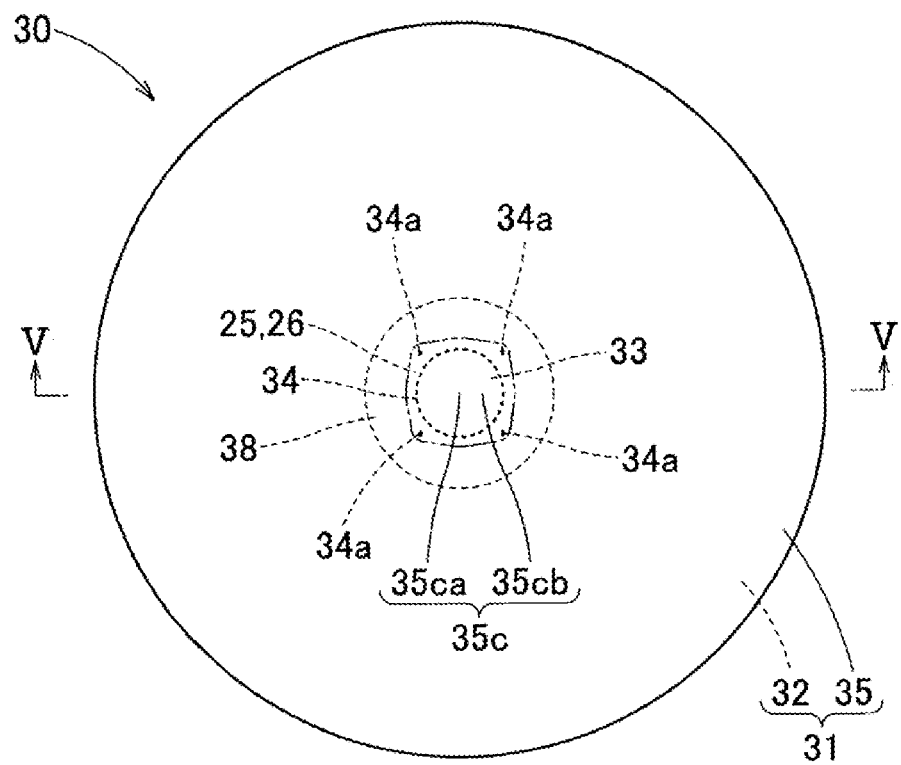
FIGS. 5A and 5B illustrate a schematic plan view and a schematic cross-sectional view illustrating a completed inflation state of the airbag according to the first embodiment as a single body.
Figure 5B:
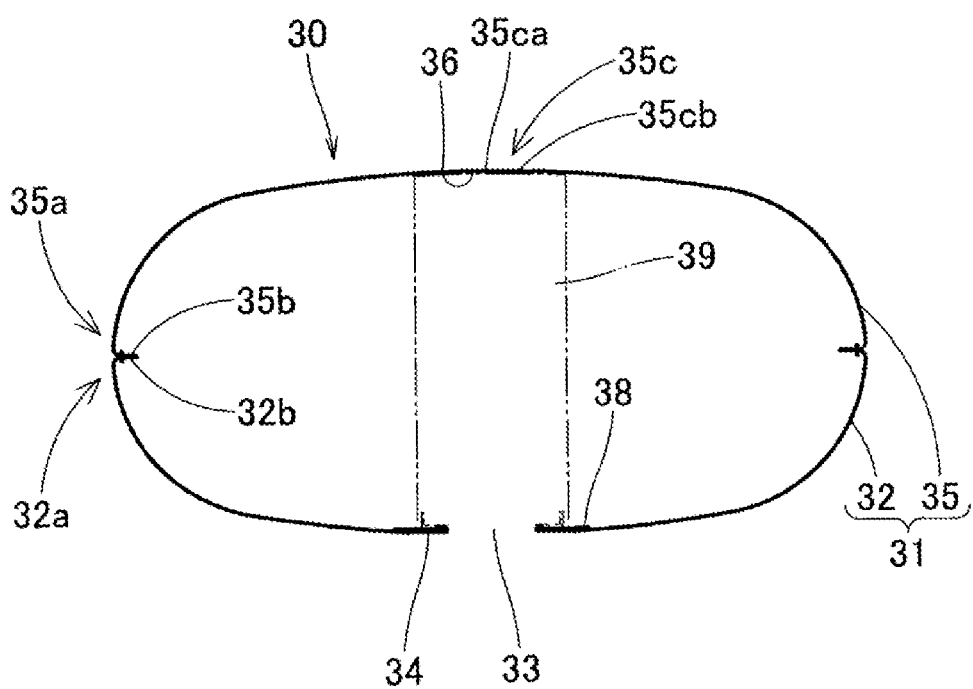
Figure 18:
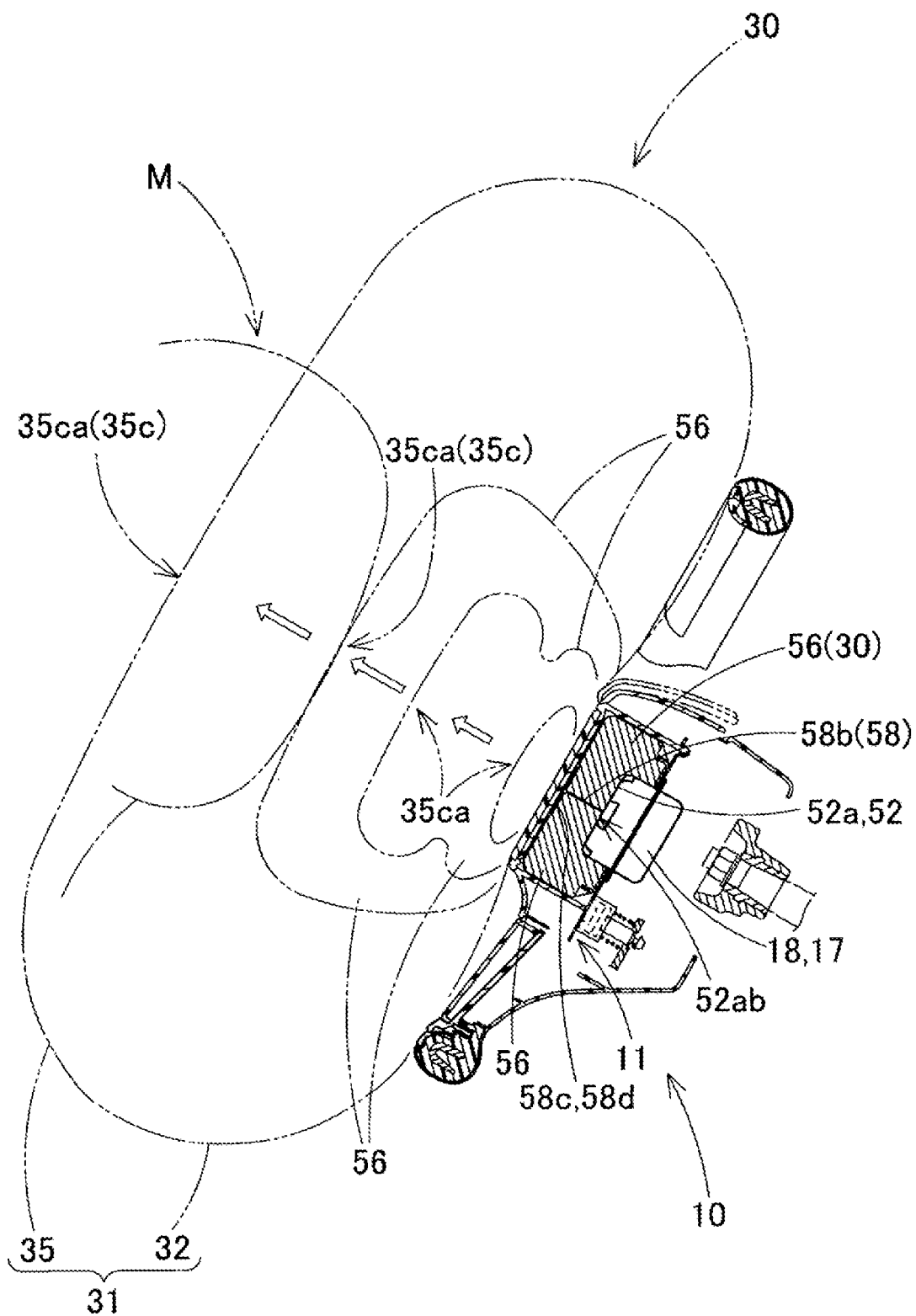
FIG. 18 is a diagram illustrating an inflated state of the airbag according to the first embodiment.
Figure 19:
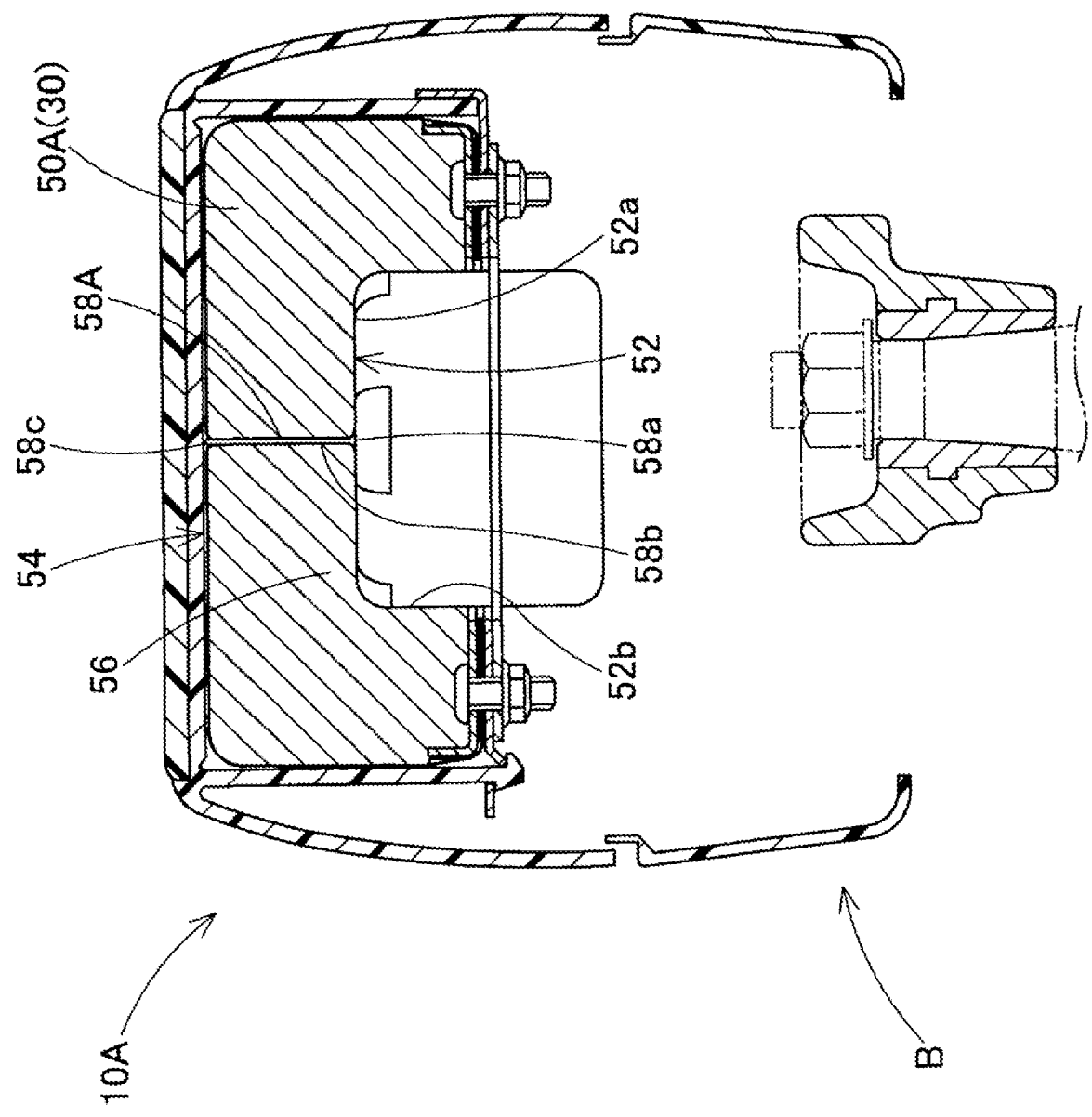
FIG. 19 is a schematic longitudinal cross-sectional view of an airbag device using a completely folded body according to a second embodiment.

As indicated by the two-dot chain line in FIGS. 1, 2, and 18, the airbag 30 has a substantially disc-shaped completely inflated shape with a thickness similar to a sphere shape and has an inflow opening 33 which is circularly opened to allow inflation gas to flow in the lower portion side (see FIG. 5). In addition, the peripheral edge of the inflow opening 33 is an attaching portion 34 to the bag holder 11 and the attaching portion 34 is formed with four through-holes 34a through which the bolts 27 of the retainer 25 pass.

An outer peripheral wall 31 of the airbag 30 includes a vehicle body side wall portion 32 with the inflow opening 33 and the attaching portion 34 described above arranged near the center and a receiving side wall portion (driver side wall portion) 35 for receiving a driver as a person to be protected in which an outer peripheral edge 35a is connected to an outer peripheral edge 32a of the vehicle body side wall portion 32 and which is disposed so as to face the vehicle body side wall portion 32. The vehicle body side wall portion 32 and the receiving side wall portion 35 are formed of a base fabric for a bag made of synthetic fiber such as polyamide or polyester having flexibility and the outer shapes thereof are circular. An outer peripheral wall 31 is formed by sewing seams 32b and 35b provided on the outer peripheral edges 32a and 35a.

In addition, the attaching portion 34 of the vehicle body side wall portion 32 has an inner surface abutting on a lower surface side of a bottom wall portion 26 of the retainer 25, which will be described below, and is a substantially square annular portion fixed to the attaching seat 12c of the bag holder 11.

As illustrated in FIGS. 1 to 3, 6, and 17, the retainer 25 is formed from a sheet metal provided with, in the center, a square annular bottom wall portion 26 having a communication opening 26a which is open in accordance with the inflow opening 33 and reinforcing ribs 28 arranged to rise from the entire periphery of the outer peripheral edge of the bottom wall portion 26. The communication opening 26a is a circular opening having the same shape as the inflow opening 33. The retainer 25 has a plurality of bolts 27 protruding downward from the bottom wall portion 26 in a circumference of the communication opening 26a around the communication opening 26a and fixing the attaching portion 34 of the airbag 30 to the bag holder 11. Respective bolts 27 protrude downward from near the four corners of the square annular bottom wall portion 26. The retainer 25 is disposed in the attaching portion 34 of the inflow opening 33 in the airbag 30. Further, each bolt 27 passes through the through-hole 34a of the airbag 30, the through-hole 12b of the bag holder 11, and the through-hole 19a of the flange portion 19 of the inflator 17 in order, and then by fastening a nut 29 to the bolt 27, the airbag 30 and the inflator 17 are attached to the bag holder 11.

Each bolt 27 also has a function as a fastener for fitting into the locking hole 82a to be described below to lock a side cover portion 82 of the wrapping material 80 which wraps the completely folded body 50.

In addition, in the portion of the attaching portion 34 in the airbag 30, an annular reinforcing cloth 38 is sewn to enhance the heat resistance of the attaching portion 34. Further, a tether 39 which extends from the outer peripheral edge of the reinforcing cloth 38, connects the attaching portion 34 and a central portion 35c of the receiving side wall portion 35, and regulates the separation distance from the attaching portion 34 near the central portion 35c of the airbag 30 when the inflation is completed is also disposed. Therefore, the retainer 25 actually abuts on the attaching portion 34 of the vehicle body side wall portion 32 with the reinforcing cloth 38 interposed therebetween.

Figure 6:
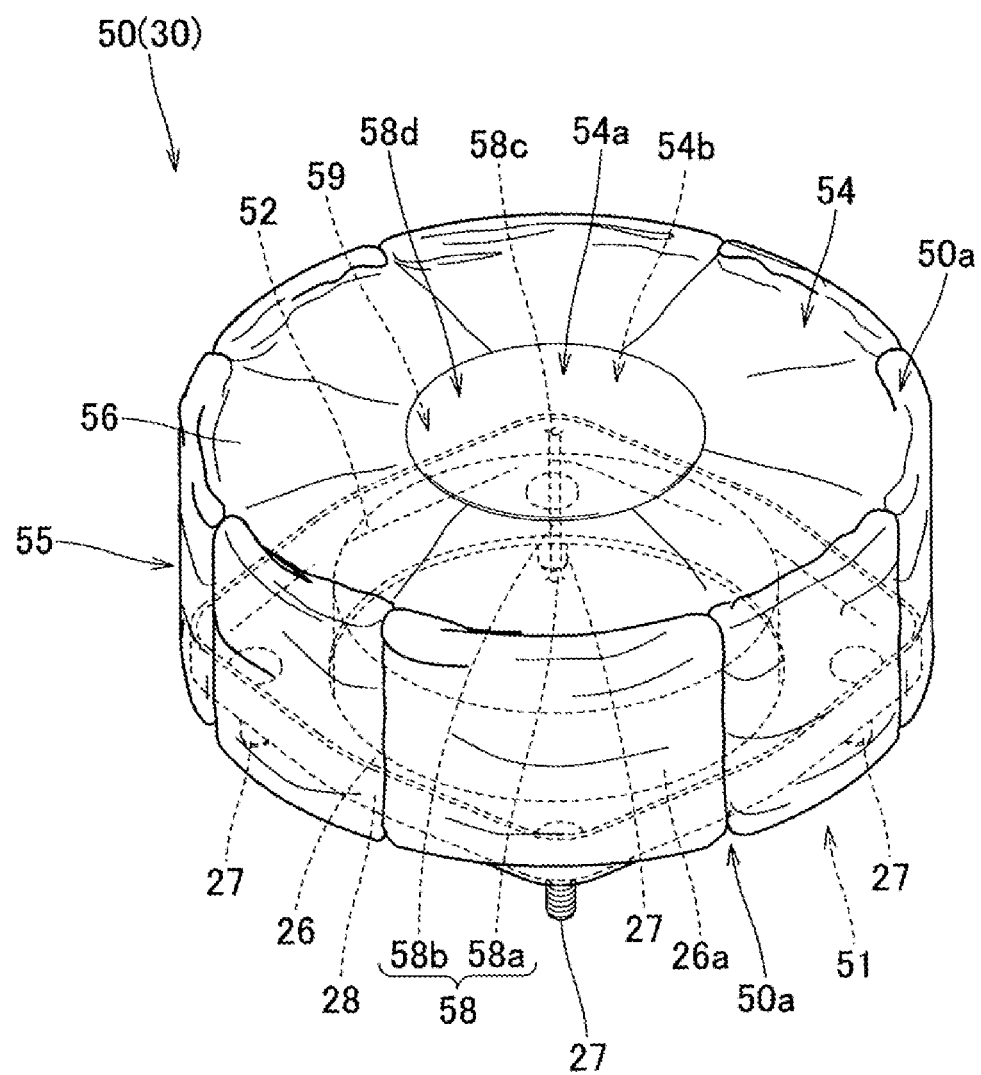
FIG. 6 is a schematic perspective view of the completely folded body in the first embodiment.

As illustrated in FIGS. 2, 3, and 6, the completely folded body 50 of the airbag 30 has a substantially cylindrical three-dimensional shape including a bottom surface 51, an upper surface 54 arranged to face the bottom surface 51, and a side surface 55 between the bottom surface 51 and the upper surface 54. Near the center of the bottom surface 51, a substantially cylindrical accommodation recess portion 52 for accommodating an upper portion 18b of the main body portion 18 on the gas supply port 18a side of the inflator 17 is formed. In addition, since the completely folded body 50 is folded by radial folding in which the outer peripheral edges 32a and 35a of the vehicle body side wall portion 32 and the receiving side wall portion 35 that are flatly deployed are gathered above the inflow opening 33, a large number of wrinkles 50a are generated and formed on the upper surface 54 side, the side surface 55 side, and also inside.

Figure 8A:
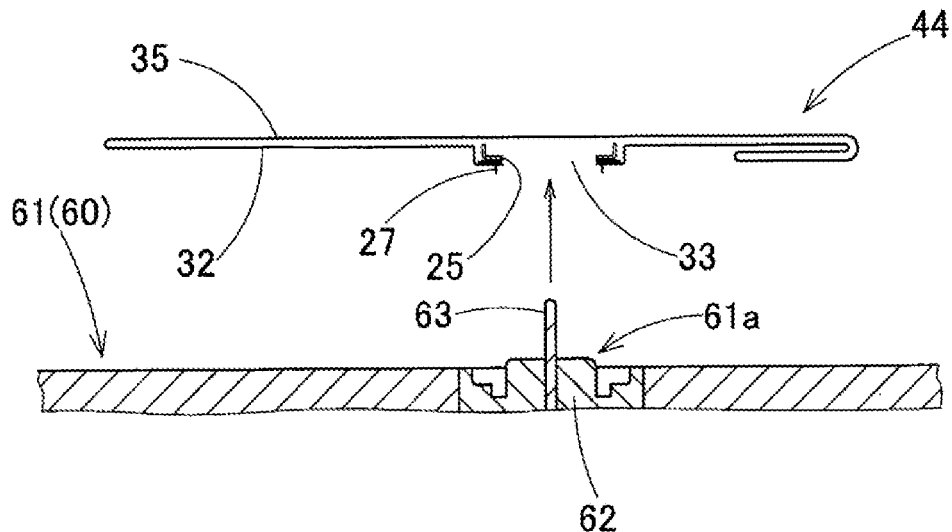
FIGS. 8A to 8C are schematic cross-sectional views illustrating radial folding in the folding step of the airbag according to the first embodiment.
Figure 8B:
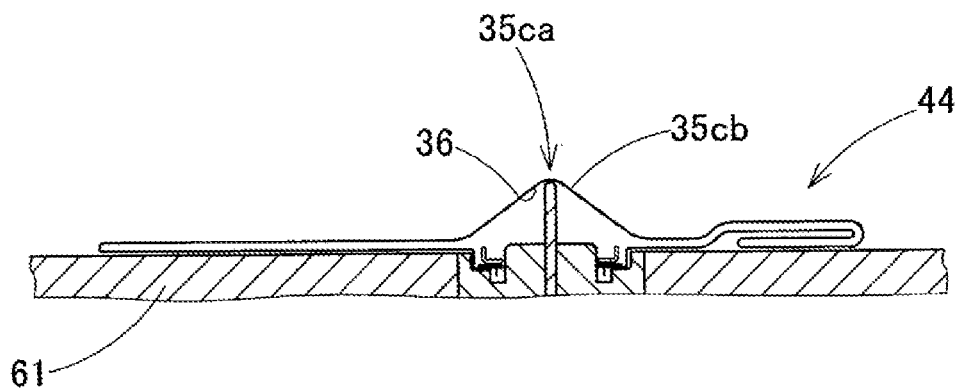
Figure 8C:
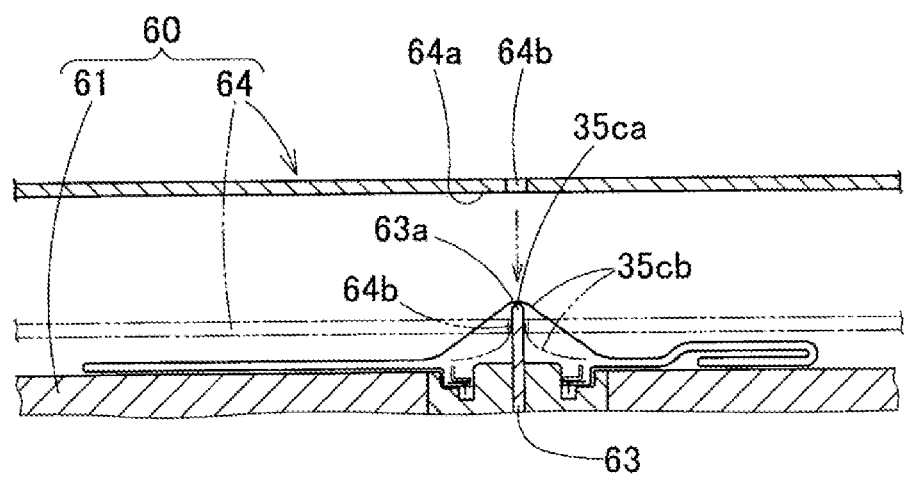
Figure 9:
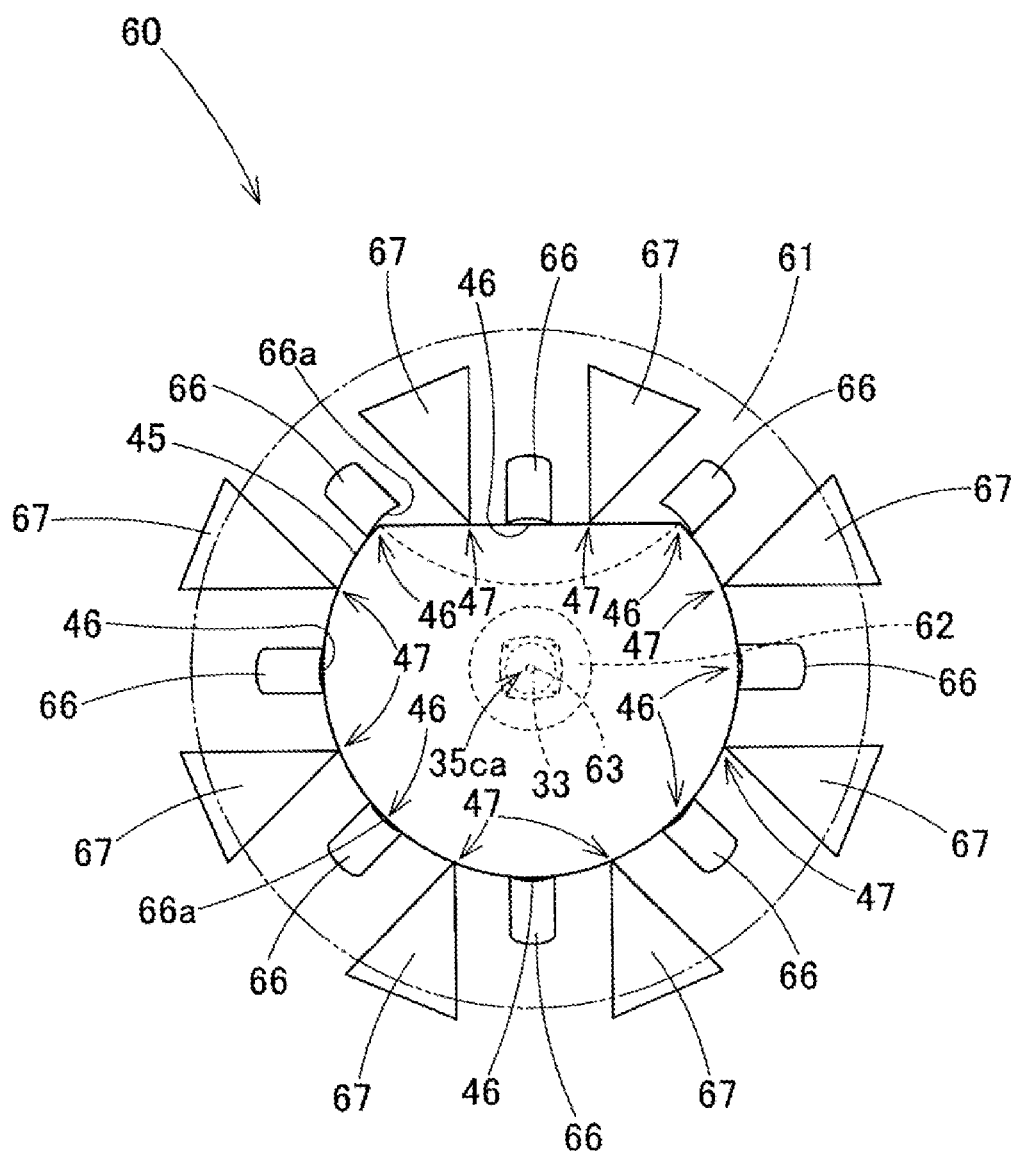
FIG. 9 is a schematic plan view illustrating radial folding of the airbag according to the first embodiment and illustrates a step subsequent to FIG. 8.
Figure 10A:
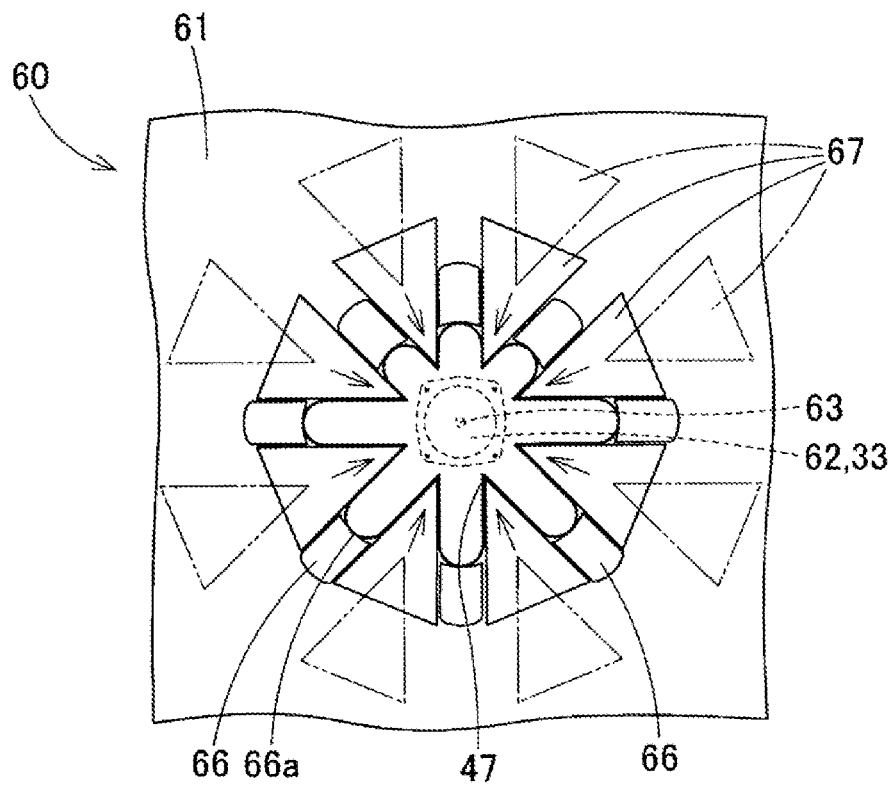
FIGS. 10A and 10B are views illustrating radial folding of the airbag according to the first embodiment and illustrate a step subsequent to FIG. 9.
Figure 10B:
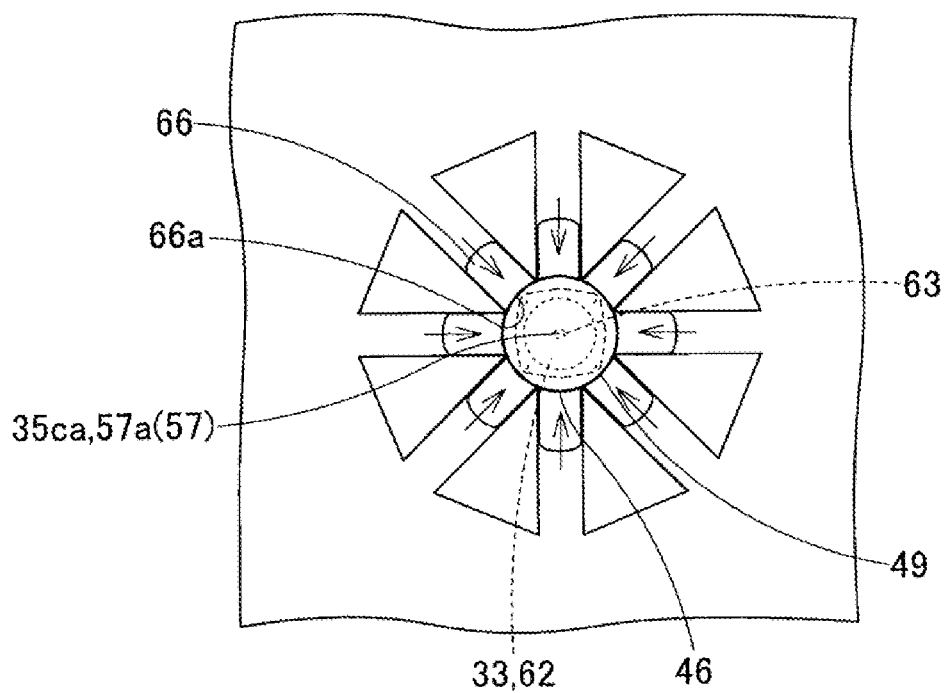

As illustrated in FIGS. 7A to 10B, the completely folded body 50 has been folded from an initial deployed body 44 which is flatly deployed through a radial folding step (see FIGS. 9 to 10B) as a first step of the folding step and a compression step (see FIGS. 14 and 15) as a second step of the folding step. The radial folding step as the first step of the folding step is a step of gathering the initial deployed body 44, which has been flatly deployed as illustrated in FIGS. 9 to 10B, above the inflow opening 33, and disposing a folded portion 56 above the inflow opening 33. The compression step as the second step is a step of compressing the upper surface 54 and the bottom surface 51 of the completely folded body 50 (pre-folded body 49) in a direction in which the surfaces approach each other. The completely folded body 50 is formed through these folding steps.

Figure 4:
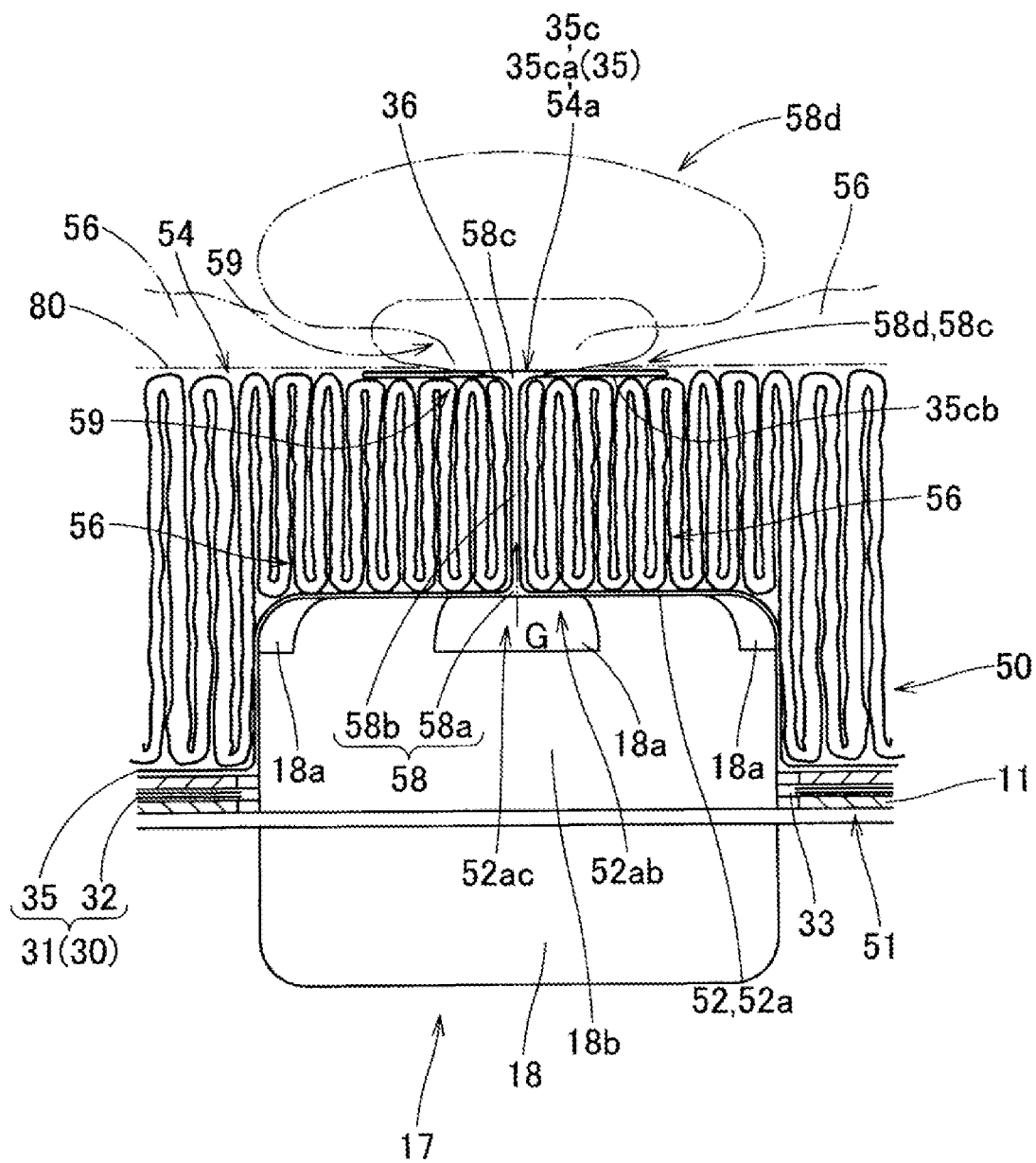
FIG. 4 is a schematic longitudinal cross-sectional view illustrating a linear supply path in the completely folded body of the airbag according to the first embodiment.

Furthermore, in the completely folded body 50, as illustrated in FIG. 4, a linear supply path 58 which extends linearly from near a center 52ac of a ceiling surface 52a of the accommodation recess portion 52 to an inner surface 36 near a center 35ca of the receiving side wall portion 35 disposed on the upper surface 54 side and can supply the inflation gas G from the inflator 17 to an inner surface 36 near the center 35ac of the receiving side wall portion 35 is formed.

As illustrated in FIGS. 3 and 4, the radially-folded folded portion 56 is disposed on a lateral side and an upper side around the accommodation recess portion 52 and the folded portion 56 is disposed so as to surround a circumference of an intermediate portion 58b between a base portion 58a near the center 52ac of the ceiling surface 52a of the accommodation recess portion 52 in the linear supply path 58 and a tip portion 58c disposed on the inner surface 36 side near the center 35ca of the receiving side wall portion 35.

Further, in the completely folded body 50 of the first embodiment, near the center 54a on the upper surface 54 side, a fold portion 59 formed by folding a peripheral edge 35cb (see FIGS. 5A, 5B, and 8A to 8C) near the center 35ca of the receiving side wall portion 35 below the vicinity of the center 35ca of the receiving side wall portion 35 and toward the intermediate portion 58b side of the linear supply path 58 is provided (see FIG. 4). In addition, the tip portion 58c of the linear supply path 58 is disposed above the fold portion 59 as a plate-like portion 58d that flatly deployed from the intermediate portion 58b so as to be exposed on the surface side of the upper surface 54.

Further, in the completely folded body 50, the recess portion 53 in which the outside of the square annular bottom wall portion 26 of the retainer 25 is recessed is disposed at the outer peripheral edge on the bottom surface 51 side (see FIG. 2). The recess portion 53 has the retainer 25 disposed in the completely folded body 50 and is formed to prevent the airbag 30 from partially biting between the retainer 25 and the bag holder 11.

Figure 16:
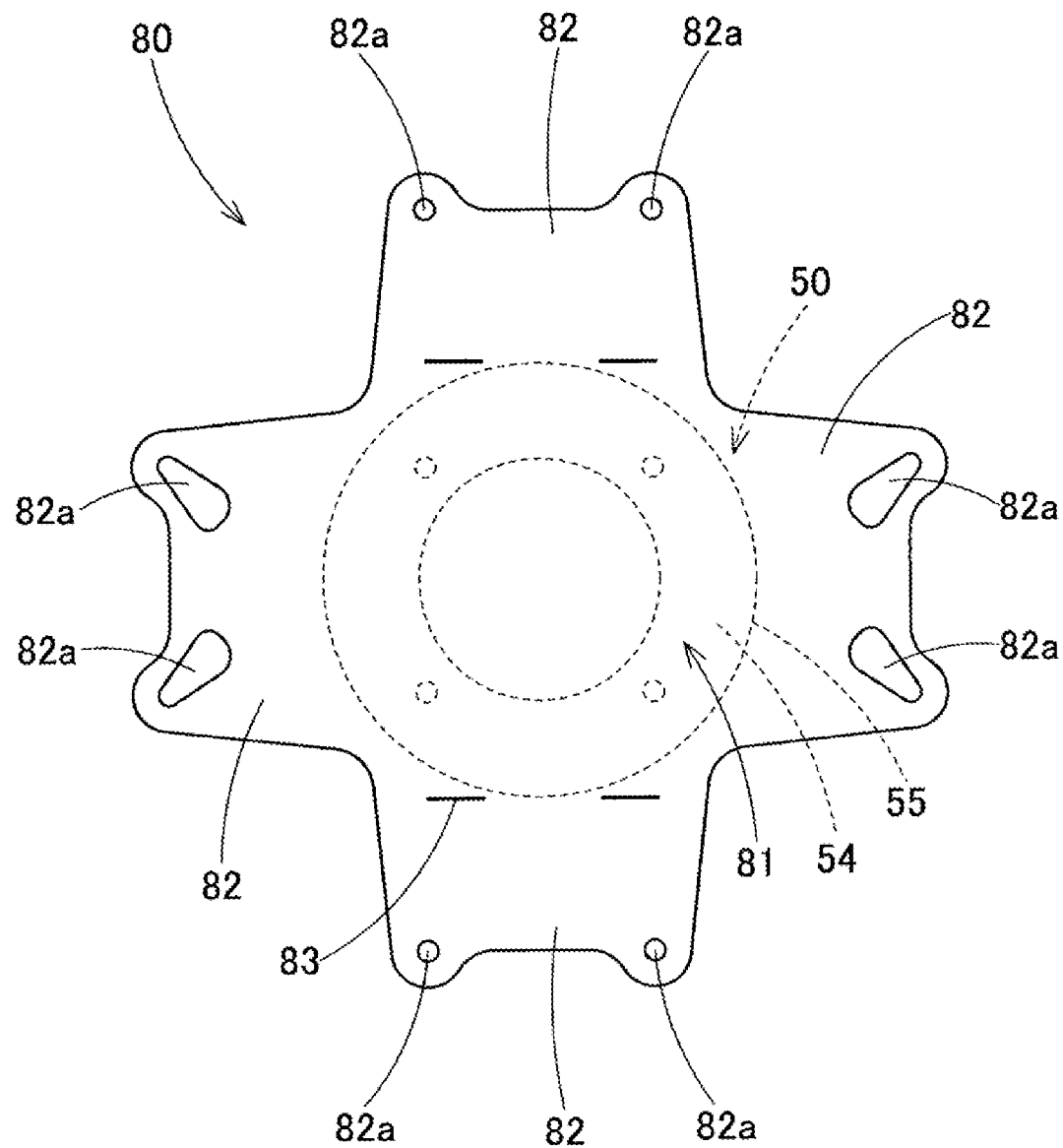
FIG. 16 is a plan view illustrating a state where a wrapping material which wraps the completely folded body of the airbag according to the first embodiment is flatly deployed.
Figure 17:
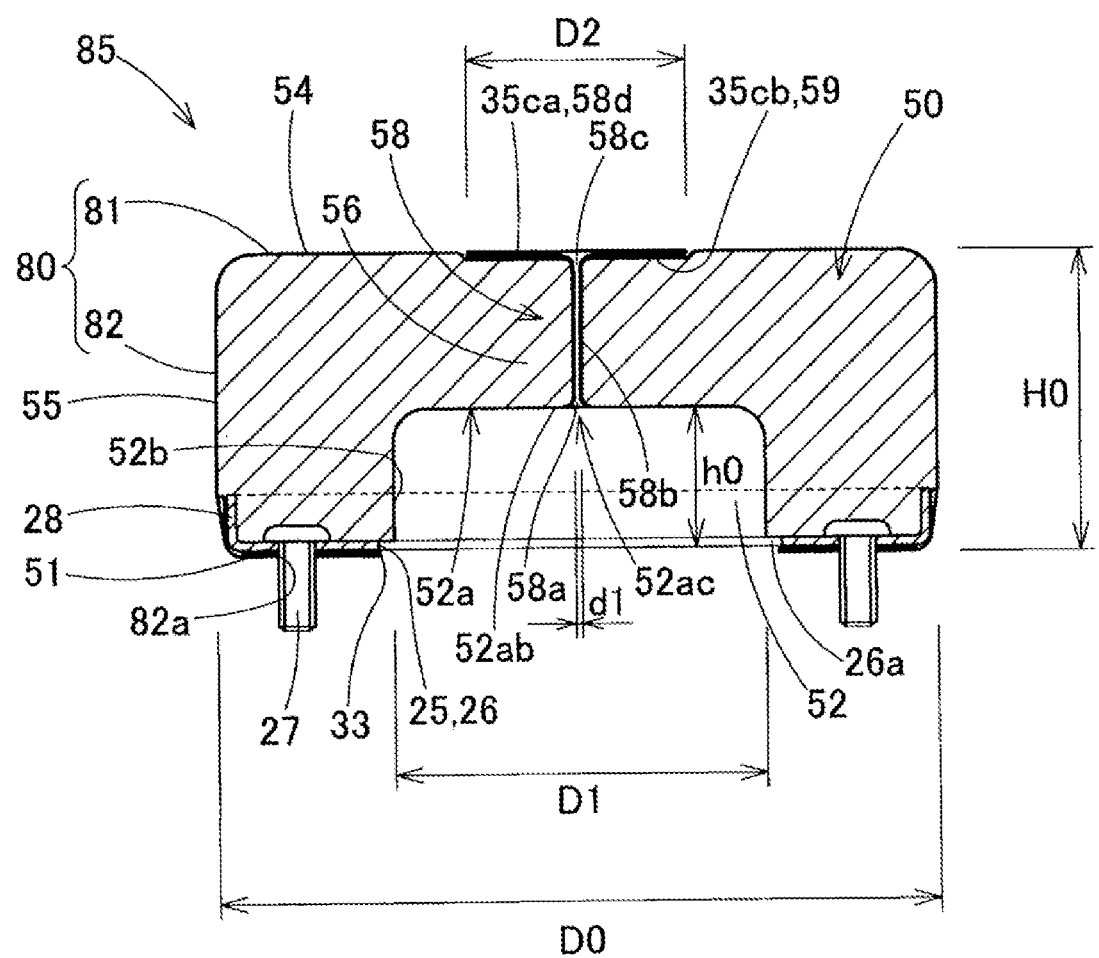
FIG. 17 is a schematic cross-sectional view of the completely folded body according to the first embodiment wrapped with the wrapping material.

As illustrated in FIGS. 16 and 17, the wrapping material 80 which wraps (covers) the completely folded body 50 is formed of a base fabric for a bag made of synthetic fiber such as polyamide or polyester, which has the same flexibility as the wall portions 32 and 35 of the airbag 30. The wrapping material 80 is configured to include a ceiling cover portion 81 covering the upper surface 54 of the completely folded body 50 and a side cover portion 82 covering the bottom surface 51 from the side surface 55. A locking hole 82a for locking to the bolt 27 of the retainer 25 is formed at the tip of the side cover portion 82. A slit 83 for breaking the boundary portion when the airbag 30 is inflated is provided at a boundary portion between the ceiling cover portion 81 and the side cover portion 82.

Figure 7A:
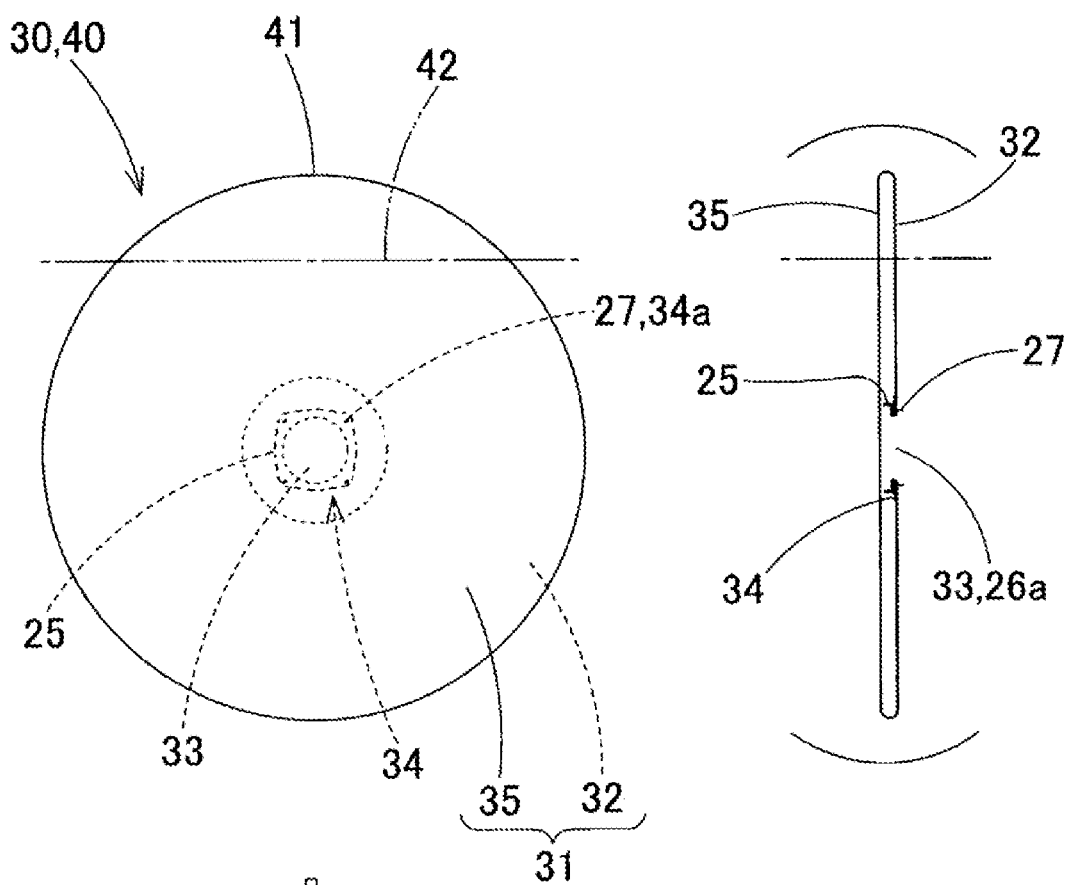
FIGS. 7A and 7B are diagrams illustrating an initial stage of a folding step of the airbag according to the first embodiment.

To explain the folding steps of the airbag 30, first, as illustrated in FIG. 7A, each bolt 27 is made to protrude from the through-hole 34a and the retainer 25 is disposed in the attaching portion 34 in the airbag 30. Then, the receiving side wall portion 35 is superimposed on the vehicle body side wall portion 32 to form an initial preparation body 40 in which the airbag 30 is flatly deployed.

Figure 7B:
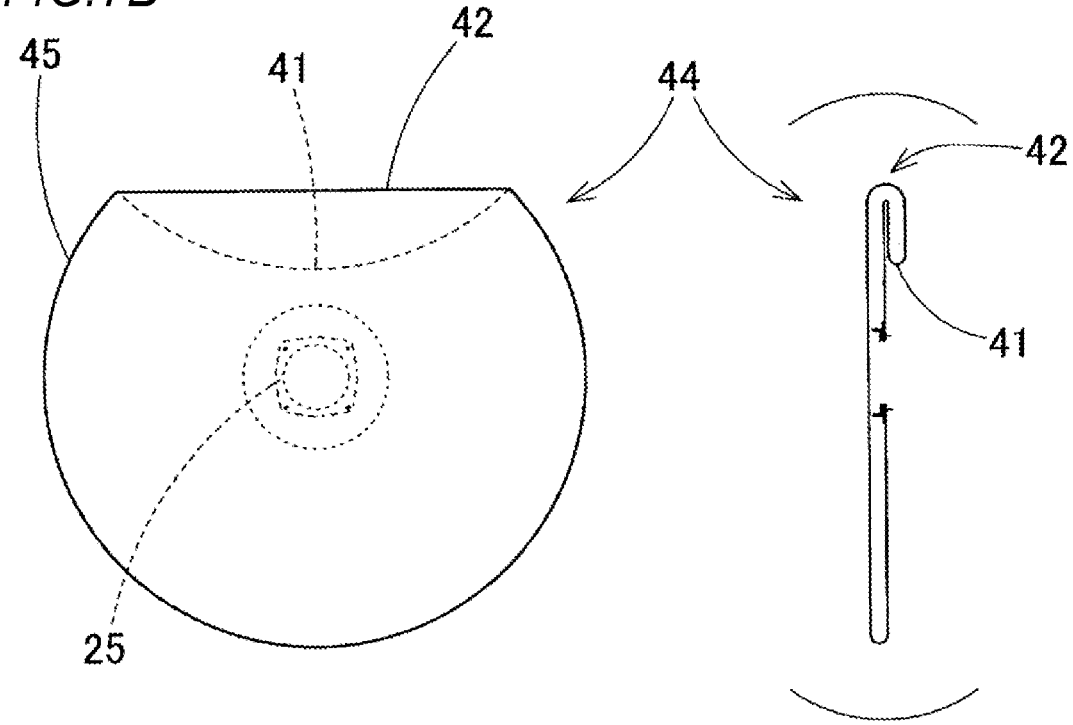

Next, as illustrated in FIG. 7B, the folding preparation body 44 is formed as an initial deployed body for radial folding. The folding preparation body 44 can be formed by providing a fold line 42 along the right-left direction on a front edge 41 side of the initial preparation body 40 and folding back the fold line 42 so as to approach the inflow opening 33 side in the vehicle body side wall portion 32.

Next, as illustrated in FIGS. 8A to 9, the folding preparation body 44 is set in a bag folder 60, and then, as illustrated in FIGS. 9 to 10B, the outer peripheral edge 45 side is gathered above the inflow opening 33 and radially folded so as to have a small diameter.

As illustrated in FIGS. 8A to 9, the bag folder 60 includes a bottom substrate 61, a ceiling substrate 64 vertically movably disposed above the bottom substrate 61, and two types of pushing jigs 66 and 67 including eight pushing jigs 66 and eight pushing jigs 67, each moving to the center 61b side of the bottom substrate 61 on the bottom substrate 61. At the center 61b on the upper surface side of the bottom substrate 61, a set portion 62 for fitting each bolt 27 of the retainer 25 protruding from the folding preparation body 44 is provided. The portion of the set portion 62 on the upper surface side of the bottom substrate 61 has a small unevenness capable of forming the recess portions 52 and 53 of the completely folded body 50 of the airbag 30 and becomes a molding surface (mold surface) 61a forming the bottom surface 51 side. The portion of the set portion 62 is configured to be movable upward from the bottom substrate 61 (see FIG. 12) and the completely folded body 50 (pre-folded body 49) after the radial folding is extruded and taken out so that the process can proceed to the compression step. Further, a rod member 63 which can move up and down is provided at the center of the set portion 62. The rod member 63 is a member for forming the linear supply path 58. In a case of the first embodiment, the rod member 63 has a tip 63a in the form of a thin cylinder which is rounded into a hemisphere shape and has a diameter dimension d0 of about 10 mm.

The pushing jig 66 is configured to be able to grip eight places 46 in the outer peripheral edge 45 of the folding preparation body 44 and push the places into the center 61b side (see FIG. 10B). Further, on the set portion 62 side of the pushing jig 66, a mold surface 66a corresponding to a circular arc-shaped curved surface of the cylindrical side surface 55 of the completely folded body 50 is formed. The pushing jig 67 has a substantially triangular plate shape with the set portion 62 side tapered. Each pushing jig 67 forms a first group which moves to the set portion 62 side before each pushing jig 66 and each pushing jig 66 forms a second group which moves after the pushing jig 67 of the first group moves.

The vicinity of the center on the lower surface side of the ceiling substrate 64 is a molding surface (mold surface) 64a for forming the upper surface 54 of the completely folded body 50. At the center of the molding surface 64a, an insertion hole 64b through which the rod member 63 is inserted is formed.

In the radial folding step of the folding step using the bag folder 60, first, as illustrated in FIGS. 8A and 8B, in a state where the folding preparation body 44 is formed, each bolt 27 is set in the set portion 62, and then, as indicated by the two-dot chain line in FIG. 8C, from the set portion 62 of the bottom substrate 61, the ceiling substrate 64 is disposed at a position having a predetermined height (equivalent to a height dimension H0 from the bottom surface 51 to the upper surface 54 of the completely folded body 50). In this case, the rod member 63 is protruded from the set portion 62, and when setting the folding preparation body 44 on the bottom substrate 61, the rod member 63 is inserted into the airbag 30 from the inflow opening 33 and comes into contact with the inner surface 36 of the center 35ca of the receiving side wall portion 35. Then, when disposing the ceiling substrate 64, the tip 63a of the rod member 63, along with the vicinity of the center 35ca of the receiving side wall portion 35, is inserted through the insertion hole 64b of the ceiling substrate 64 and is protruded from the ceiling substrate 64.

Next, as illustrated in FIG. 9, the pushing jigs 66 and 67 are moved to the set portion 62 side and the pushing jig 66 grips predetermined eight places 46 of the outer peripheral edge 45 of the folding preparation body 44. Then, as illustrated in FIG. 10A, first, each pushing jig 67 of the first group is moved to the set portion 62 side (inflow opening 33 side), and with leaving region on the set portion 62 side of the pushing jig 66 in the folding preparation body 44, the eight push-in places 47 of the outer peripheral edge 45 of the folding preparation body 44 are pushed into the set portion 62 side.

Figure 11A:
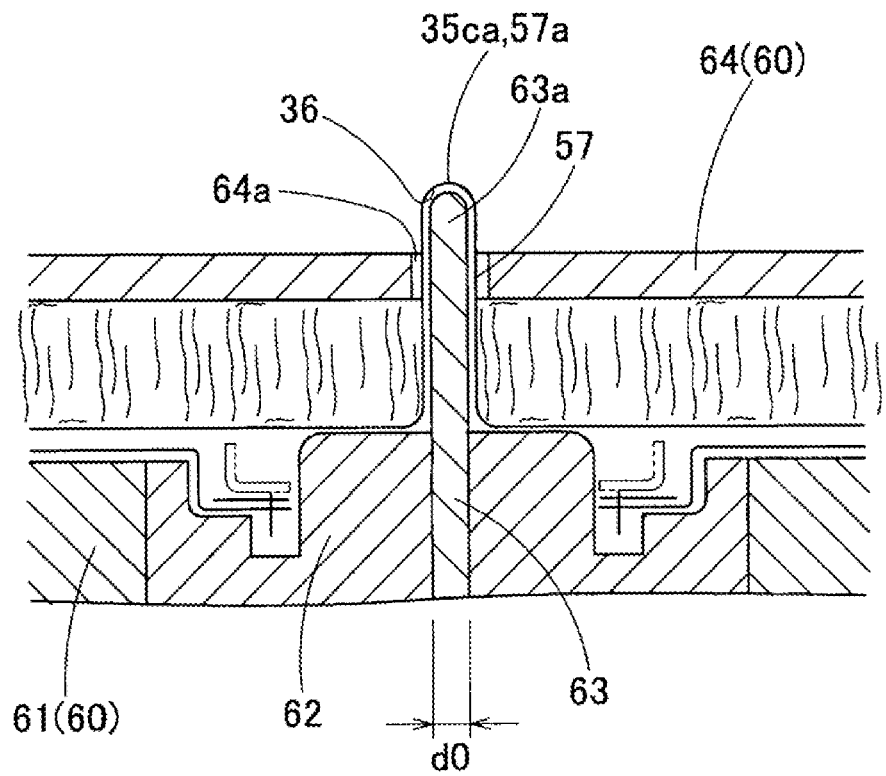
FIGS. 11A and 11B are schematic cross-sectional views illustrating a state where a rod member is pulled out before completion of radial folding.
Figure 11B:
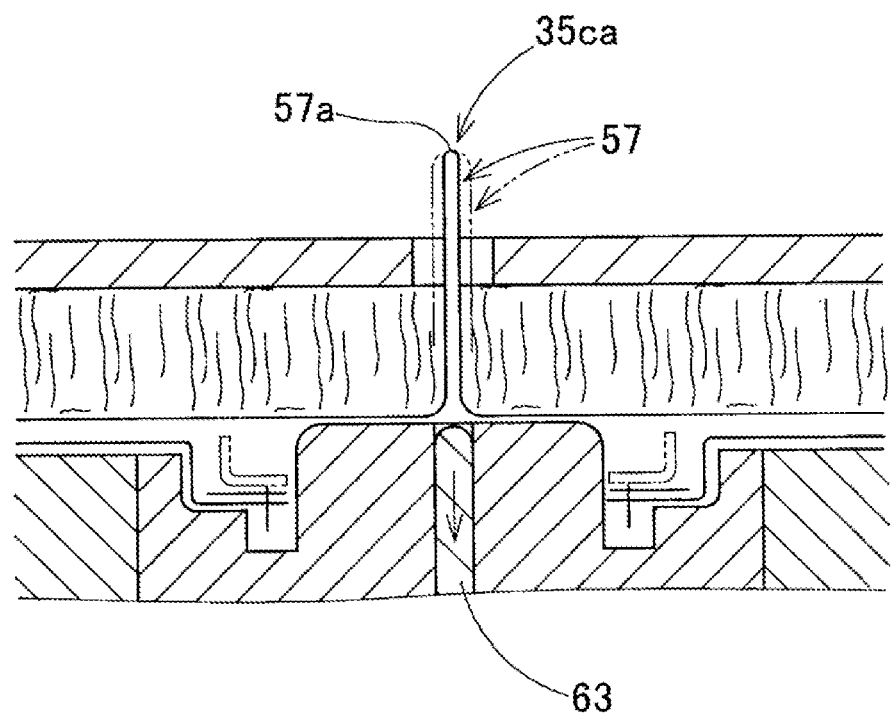

Then, as illustrated in FIGS. 11A and 11B, the rod member 63 is lowered to the lower side of the set portion 62 and gripping of gripping places 46 of the outer peripheral edge 45 in each pushing jig 66 of the second group is released, and then each pushing jig 66 is moved to the set portion 62 side and the eight places 46 are pushed into the set portion 62 side as illustrated in FIG. 10B.

Figure 12:
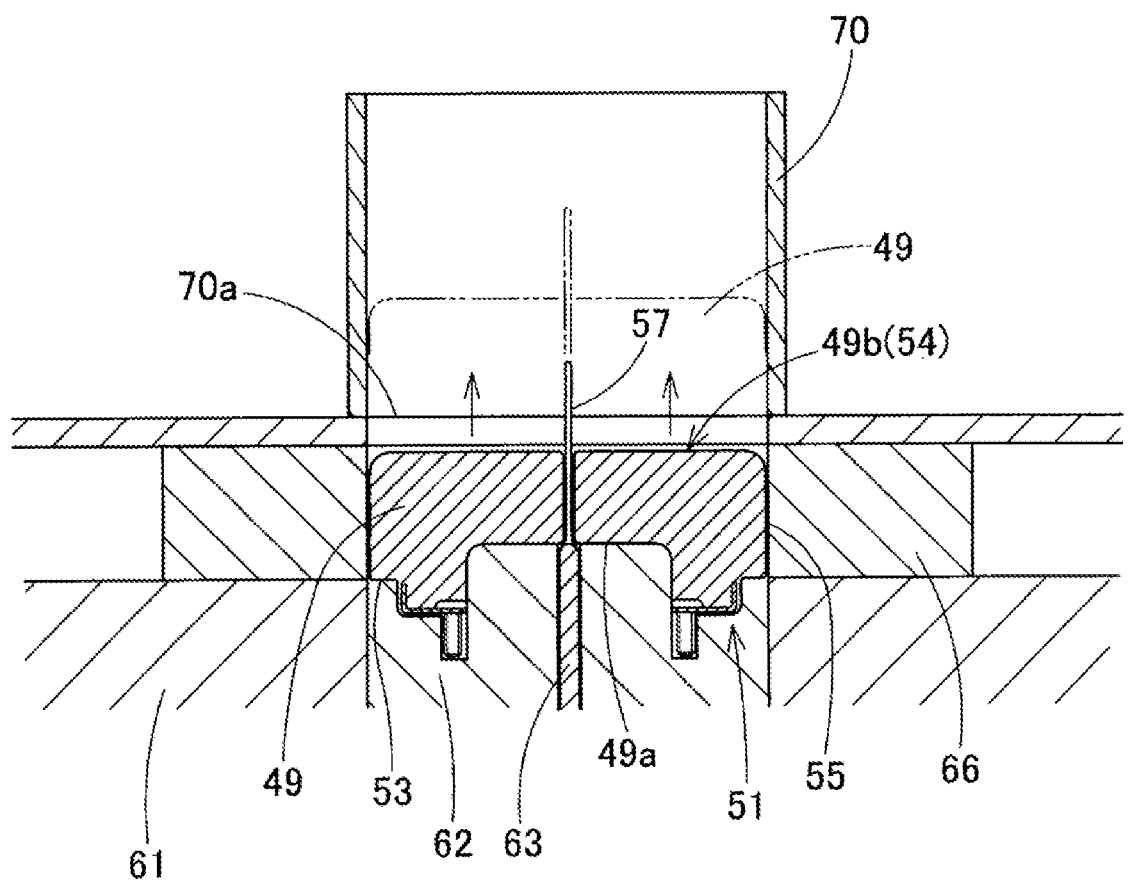
FIG. 12 is a schematic cross-sectional view illustrating a preparation step of shifting to a compression step in the folding step of the airbag according to the first embodiment and illustrates a step subsequent to FIGS. 10A and 10B.

Then, as illustrated in FIG. 12, the folding preparation body 44 is radially folded into the substantially cylindrical pre-folded body 49 equivalent to the substantially cylindrical completely folded body 50. Although this pre-folded body 49 is present before the compression step, the upper surface 54 and the side surface 55 similar to that of the completely folded body 50 and the bottom surface 51 having the recess portion 49a and the recess portion 53 having a smaller volume than the recess portion 52 are provided.

In addition, pushing-in of the pushing jig 66 of the second group is performed after pulling out the rod member 63. Thus, as illustrated in FIGS. 11A and 11B, a pipe-shaped conduit portion 57 for forming a supply path immediately after the rod member 63 has been pulled out has a small diameter (equivalent to an inner diameter dimension dl (see FIG. 17) of the intermediate portion 58b of the linear supply path 58, and in a case of the embodiment, the diameter is about 2 mm to 3 mm) due to the pushing-in of the pushing jig 66 thereafter. In addition, the tip 57a side is in a state of protruding upward from the insertion hole 64b of the ceiling substrate 64.

After the radial folding step, in order to perform the compression step, as illustrated in FIG. 12, the set portion 62 of the bottom substrate 61 is pushed up to transfer the pre-folded body 49 into a tube jig 70 through an opening end 70a.

Figure 13:
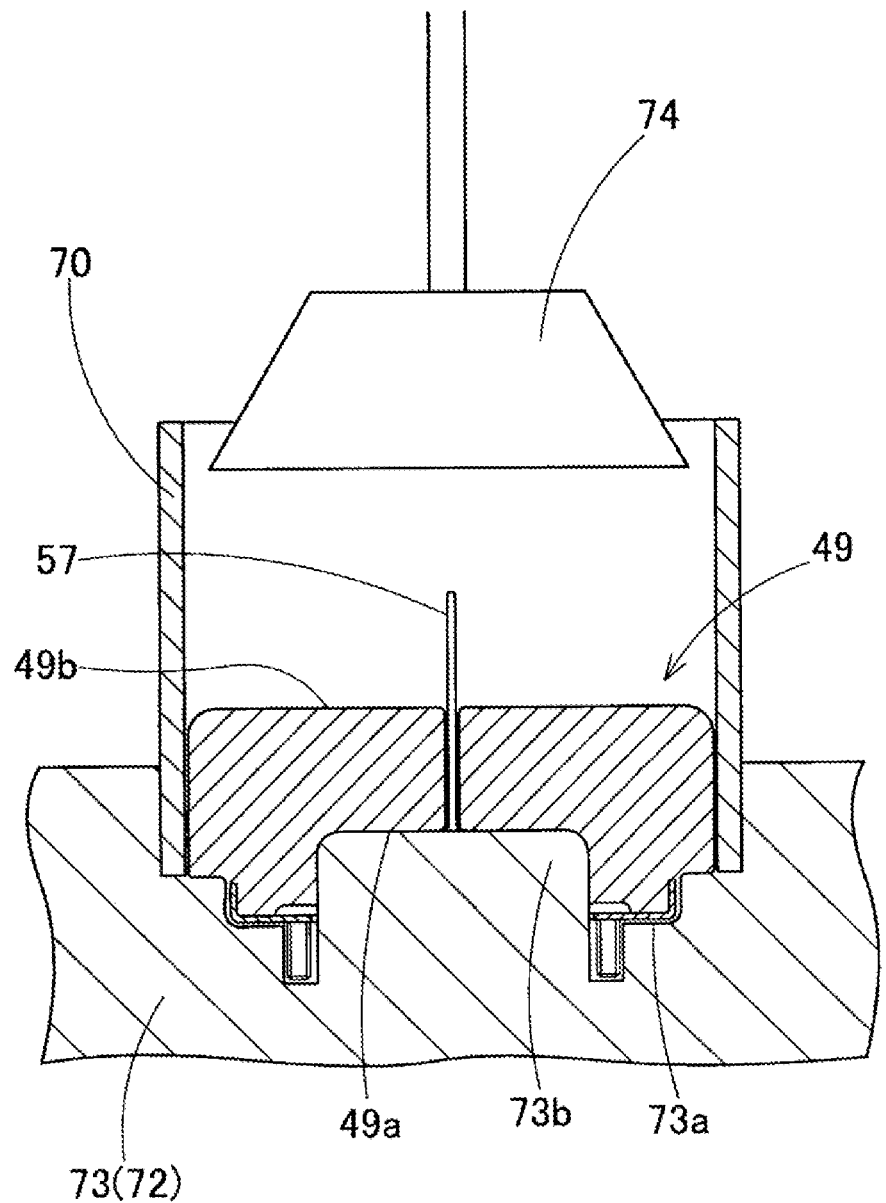
FIG. 13 is a diagram illustrating a heating preparation stage in the compression step of the airbag according to the first embodiment.

Then, as illustrated in FIG. 13, the tube jig 70 accommodating the pre-folded body 49 is set in a set portion 73a of a fixed side portion 73 for heating of a bag press machine 71 which performs the compression step.

Figure 14:
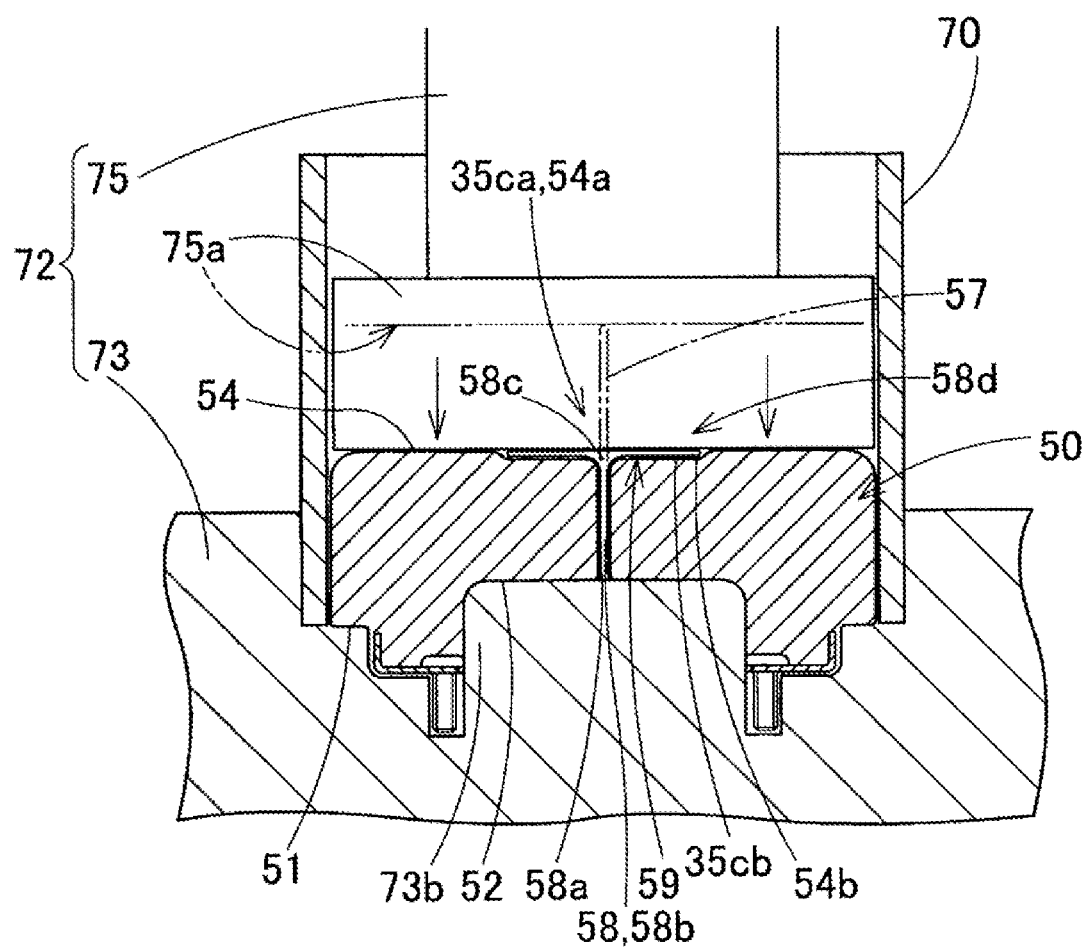
FIG. 14 is a diagram illustrating a compression heating step in the compression step in the folding step of the airbag according to the first embodiment.
Figure 15:
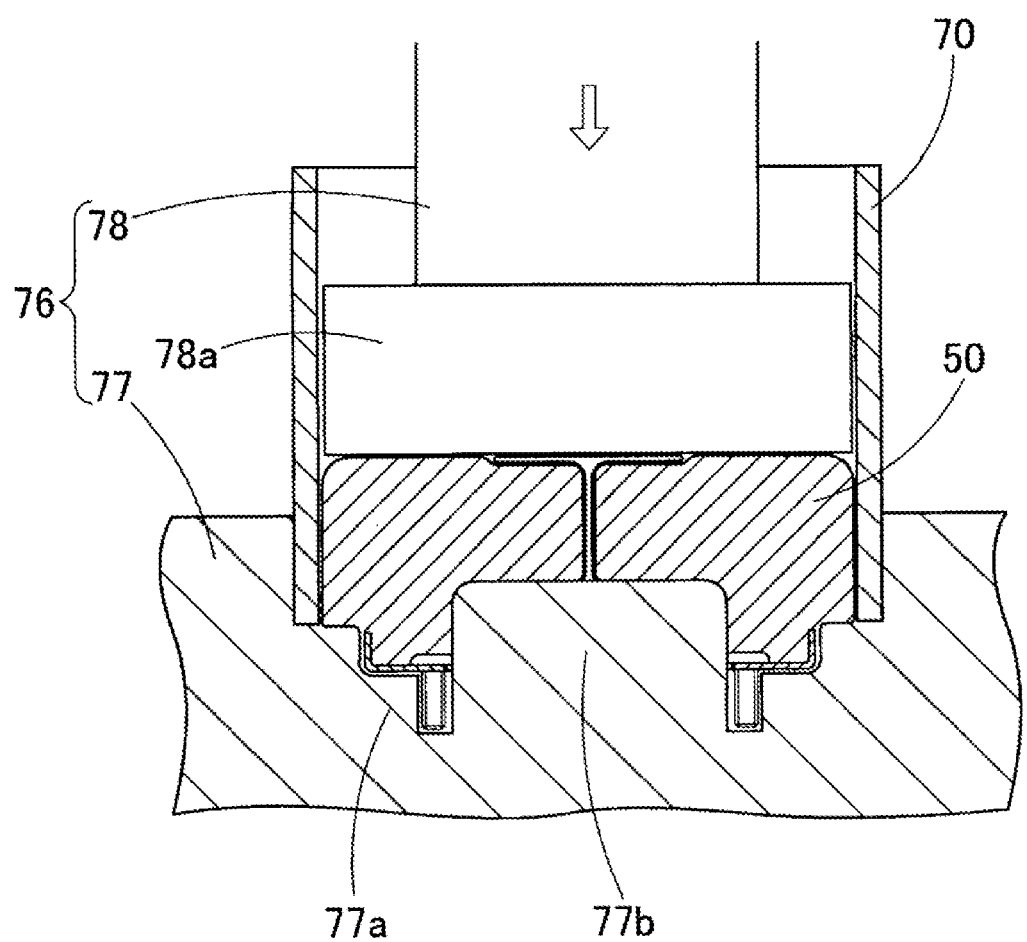
FIG. 15 is a diagram illustrating a compression cooling step in the compression step of the airbag according to the first embodiment.

In addition, as illustrated in FIGS. 14 and 15, the bag press machine 71 includes a heating mold 72 having a fixed side portion 73 and a movable side portion 75 for performing heating compression and a cooling mold 76 having a fixed side portion 77 and a movable side portion 78 for performing cooling compression. In the heating mold 72, the fixed side portion 73 has the tube jig 70 and the set portion 73a for accommodating the lower side of the pre-folded body 49. Further, in the set portion 73a, a convex portion 73b for shaping the accommodation recess portion 52 is formed and the movable side portion 75 includes a pressing portion 75a which is inserted into the tube jig 70 and compresses the pre-folded body 49. In the cooling mold 76, the fixed side portion 77 has the tube jig 70 and a set portion 77a for accommodating the lower side of the completely folded body 50, and in the set portion 77a, a convex portion 77b corresponding to the accommodation recess portion 52 is formed. The movable side portion 78 includes a pressing portion 78a which is inserted into the tube jig 70 and compresses the completely folded body 50. The fixed side portion 73 and the movable side portion 75 of the heating mold 72 have a built-in heater (not illustrated) which can heat the pre-folded body 49 to about 150° C. and the fixed side portion 77 and the movable side portion 78 of the cooling mold 76 are provided with a cooling water flow path (not illustrated) capable of cooling the heated completely folded body 50 to about 5° C.

Before the heating compression is performed, as illustrated in FIG. 13, an air duct 74 for blowing hot air to raise the temperature of the pre-folded body 49 is inserted into the tube jig 70 and the temperature of the pre-folded body 49 is increased.

Then, when the temperature of the pre-folded body 49 is increased, the air duct 74 is removed, and as illustrated in FIG. 14, the pressing portion 75a of the movable side portion 75 is inserted into the tube jig 70 and the pre-folded body 49 is heated and compressed to form the completely folded body 50.

In this case, the conduit portion 57 provided on the pre-folded body 49 is further compressed to have a smaller diameter to form the base portion 58a and the intermediate portion 58b of the linear supply path 58. In addition, the tip 57a of the conduit portion 57 which protrudes from the upper surface 49b side of the pre-folded body 49 is crushed, flatly deployed near the center 54a of the upper surface 54 of the completely folded body 50, and is formed into a substantially disc-shaped plate-like portion 58d so as to be folded over the peripheral edge 54b near the center 54a, thereby forming the tip portion 58c of the linear supply path 58.

In this case, the recess portion 49a of the pre-folded body 49 is formed in the accommodation recess portion 52 slightly larger than the recess portion 49a capable of accommodating the upper portion 18b of the main body portion 18 of the inflator 17.

Then, when the external shape of the completely folded body 50 is shaped, as illustrated in FIG. 15, the completely folded body 50 is set together with the tube jig 70 in the fixed side portion 77 of the cooling mold 76, and further, by inserting the pressing portion 78a of the movable side portion 78 into the tube jig 70 and cooling and compressing the completely folded body 50, the completely folded body 50 with a stable folded shape can be obtained.

Next, the completely folded body 50 is taken out from the tube jig 70 removed from the cooling mold 76, and as illustrated in FIGS. 16 and 17, the ceiling cover portion 81 of the wrapping material 80 is placed on the upper surface 54 side of the completely folded body 50. Further, the side cover portion 82 is disposed from the side surface 55 to the bottom surface 51 side, the bolt 27 of the corresponding retainer 25 is inserted into the locking hole 82a at the tip, the side cover portion 82 is locked to the bolt 27, and thus a bag assembly body 85 in which the completely folded body 50 is wrapped with the wrapping material 80 can be formed.

When assembling the airbag device 10, first, the bag assembly body 85 is fitted to the inner peripheral surface side of the side wall portion 23 of the airbag cover 20. Then, each bolt 27 of the bag assembly body 85 is passed through the through-hole 12b of the bag holder 11, each locking leg portion 24 of the airbag cover 20 is inserted into the locking hole 12e of the bag holder 11, and while bending each tongue piece portion 12f outward so as to be locked to the inner protrusion 24a of the locking leg portion 24, the outer protrusion 24b of the locking leg portion 24 is locked to the inner peripheral edge on the outer edge side of the locking hole 12e and the airbag cover 20 is attached to the bag holder 11. Each switch body 15 is attached to the bag holder 11 in advance. Then, while inserting the upper portion 18b of the main body portion 18 of the inflator 17 from below into the accommodation recess portion 52 of the completely folded body 50, each bolt 27 protruding from the bag holder 11 is passed through the through-hole 19a of the inflator 17. Further, the nut 29 is fastened to each bolt 27, the bag assembly body 85 and the inflator 17 are attached and fixed to the bag holder 11 to which the airbag cover 20 is attached, and thus the airbag device 10 can be assembled.

In a case of mounting the airbag device 10 on the vehicle, the lower end of the assembly pin 15a of each switch body 15 is inserted into the locking hole 5a of each fixing portion 5 of the steering wheel main body 1 already assembled to the steering shaft SS and the assembly pin 15a is locked to the locking pin 5b. In this case, the airbag device 10 can be attached to the steering wheel main body 1, and the assembly of the steering wheel W is completed and the steering wheel W can be mounted on the vehicle together with the airbag device 10.

When attaching the airbag device 10 to the steering wheel main body 1, a lead wire (not illustrated) of the bag holder 11 is connected to the positive electrode side of the horn operation circuit and a lead wire (not illustrated) for inputting an operation signal is connected to the inflator 17.

After the airbag 30 is mounted on the vehicle, when the operation signal is input to the inflator 17, the inflator 17 discharges the inflation gas G from the gas supply port 18a, so that the folded airbag 30 inflates by inflowing the inflation gas G. Further, the airbag 30 breaks the ceiling cover portion 81 of the wrapping material 80, pushes and opens the door portion 21a of the ceiling wall portion 21 of the airbag cover 20, and protrudes from the open opening of the door portion 21a. Therefore, the airbag 30 deploys and inflates so as to cover the upper surface of the ring portion R from above the boss portion B (see the two-dot chain line in FIGS. 1, 2, and 18).

In the completely folded body 50 of the airbag 30 of the first embodiment, at the initial stage of the inflow of the inflation gas G, the accommodation recess portion 52 is filled with the inflation gas G and presses the ceiling surface 52a and the side surface 52b on the inner peripheral surface of the accommodation recess portion 52. In this case, some inflation gas G flows quickly and linearly from the base portion 58a of the linear supply path 58, through the intermediate portion 58b, to the tip portion 58c and reaches the inner surface 36 near the center 35ca of the receiving side wall portion 35 where the tip portion 58c is located. Therefore, as indicated by the two-dot chain line in FIG. 18, the vicinity of the center 35ca of the receiving side wall portion 35 is quickly pushed up and promptly deployed. In addition, the portion 52ab around the linear supply path 58 on the ceiling surface 52a of the accommodation recess portion 52, that is, the radially-folded folded portion 56 is also pushed up by the inflation gas G, quickly protrudes from the accommodation portion (bag holder) 11 of the completely folded body 50, and can be deployed while eliminating folding.

Therefore, the completely folded body 50 of the airbag 30 of the first embodiment can quickly perform both upward projection near the center 35ca of the receiving side wall portion 35 at the initial stage of inflow of the inflation gas G and elimination of the folding of the radially-folded folded portion 56.

In the completely folded body 50 of the first embodiment, around the center 54a on the upper surface 54 side, the peripheral edge 35cb near the center 35ca of the receiving side wall portion 35, a fold portion 59 which is formed by folding the peripheral edge 35cb near the center 35ca of the receiving side wall portion 35 below the vicinity of the center 35ca of the receiving side wall portion 35 and toward the intermediate portion 58b side of the linear supply path 58 is provided. Further, the tip portion 58c of the linear supply path 58 is disposed above the fold portion 59 as the plate-like portion 58d that deploys flatly from the intermediate portion 58b so as to be exposed on the surface side of the upper surface 54.

Therefore, in the completely folded body 50 of the first embodiment, on the upper surface 54 of the completely folded body 50, the tip portion 58c of the linear supply path 58 is disposed as the plate-like portion 58d that is flatly deployed so as to be exposed over a wide area. Therefore, at the initial stage of inflow of the inflation gas G, the inflation gas G passing through the linear supply path 58 flows into the plate-like portion 58d of the tip portion 58c of the linear supply path 58, the plate-like portion 58d is inflated, the vicinity of the center 35ca of the receiving side wall portion 35 is quickly protruded as a wide and flat portion, and the folding of the fold portion 59 is eliminated. As a result, the fold portion is widely deployed. Therefore, in the airbag 30, as illustrated in FIG. 18, a driver M as a person to be protected that has approached can be received by a flat and wide area, and thus the driver M can be suitably protected.

In the completely folded body 50 of the first embodiment, the outer diameter dimension D0 is about 100 mm, the height dimension HO is about 50 mm, the inner diameter dimension D1 of the accommodation recess portion 52 is about 60 mm, and the depth dimension h0 of the accommodation recess portion 52 is about 25 mm (see FIG. 17).

The inner diameter dimension dl of the intermediate portion 58b of the linear supply path 58 is set to 2 mm to 3 mm. However, when the inner diameter dimension dl is extremely large compared to the inner diameter dimension D1 of the accommodation recess portion 52, in the initial stage of the inflow of the inflation gas G, the area pushed up from the ceiling surface 52a side upward the radially-folded folded portion 56 around the intermediate portion 58b of the linear supply path 58 is reduced, and thus it is difficult to quickly eliminate the folding of the folded portion 56. Therefore, it is desirable that the inner diameter dimension dl be set to 1 mm or more, at which the inflation gas can flow quickly, and ⅓ or less of the inner diameter dimension D1 of the accommodation recess portion 52.

In addition, the outer diameter dimension (or maximum width dimension) D2 to be developed on the upper surface 54 side of the completely folded body 50 of the plate-like portion 58d may be larger than the inner diameter dimension dl of the intermediate portion 58b of the linear supply path 58 and may be set up to the outer diameter dimension D0 of the completely folded body 50. However, in the compression step, when the tip 57a of the conduit portion 57 is simply crushed to form a plate-like portion 58d, if trying to be flatly deployed while uniformly maintaining the distance (radius dimension/width dimension) to the outer edge centered on the tip of the intermediate portion 58b, it is difficult to secure a large radius dimension (width dimension). As a result, desirably, the outer diameter dimension is substantially about 20 mm to 30 mm.

In the folding method of the completely folded body 50 of the first embodiment, when radial folding is performed, as illustrated in FIGS. 8A to 8C, through the inflow opening 33, the radial folding is performed in a state where the rod member 63 for forming a linear supply path for lifting the inner surface 36 near the center 35ca of the receiving side wall portion 35 is inserted. Then, as illustrated in FIGS. 11A and 11B, the rod member 63 is pulled out and the trace of pulling out the rod member 63 is formed as the linear supply path 58 (specifically, the conduit portion 57 for forming a supply path).

Therefore, in the folding method of the first embodiment, in the initial deployed body (folding preparation body) 44 of the airbag 30 in which the receiving side wall portion 35 is superposed on the vehicle body side wall portion 32 and is flatly deployed, the rod member 63 for forming a linear supply path is inserted from the inflow opening 33. Further, in a state of lifting a portion near the center 35ca of the receiving side wall portion 35, radial folding is performed to gather the outer peripheral edge 45 of the folding preparation body (initial deployed body) 44 with the front edge 41 side of the initial preparation body 40 folded above the inflow opening 33. Then, after pulling out the rod member 63, the linear supply path 58 formed of the trace of pulling out the rod member 63 can be formed at the center portion of the radially-folded folded portion 56. That is, in the folding method of the first embodiment, the completely folded body 50 having the linear supply path 58 at the center portion can be easily formed.

Furthermore, in the folding method of the first embodiment, when radially folding is performed such that the outer peripheral edge 45 side in the state where the receiving side wall portion 35 is overlaid on the vehicle body side wall portion 32 and is flatly deployed is gathered above the inflow opening 33, a large number of pushing jigs 66 and 67 arranged radially around the inflow opening 33 are pushed into the inflow opening 33 side. Further, at the time of pushing-in, a plurality of groups which are displaced in a circumferential direction of the inflow opening are sequentially pushed in (in a case of the first embodiment, the pushing jig 67 of the first group is pushed in and then the pushing jig 66 of the second group is pushed in) and thus radially folding is performed. Moreover, radially folding is performed by pulling out the rod member 63 for forming a linear supply path that is inserted before pushing-in after pushing-in the pushing jig 67 of the first group of the first time, and then pushing-in the pushing jig 66 of the subsequent second group.

In such a folding method, the trace of pulling out the rod member 63 is further compressed by the pushing jig 66 together with the outer peripheral surface of the completely folded body 50. Therefore, the outer diameter dimension (diameter dimension) D0 of the completely folded body 50 can be made smaller.

When the above points are not taken into consideration, the rod member 63 may be pulled out after pushing-in the pushing jig 66 of the subsequent second group, that is, at the end after finishing the radial folding step.

In the first embodiment, the tip portion 58c of the linear supply path 58 of the completely folded body 50 is disposed so as to be exposed to the outer surface side on the upper surface 54 side of the completely folded body 50 as the plate-like portion 58d which is deployed wider than the intermediate portion 58b. However, a linear supply path 58A may be configured like a completely folded body 50A of a second embodiment illustrated in FIGS. 19 to 21C.

In the linear supply path 58A of the completely folded body 50A used for an airbag device 10A of the second embodiment, without the plate-like portion 58d of the linear supply path 58, the tip portion 58c extending from the base portion 58a on the ceiling surface 52a side of the accommodation recess portion 52 through the intermediate portion 58b is disposed so as to coincide with the upper surface 54 and to be continuous with the upper surface 54 without being deployed widely on the upper surface 54 side of the completely folded body 50A.

Figure 20:
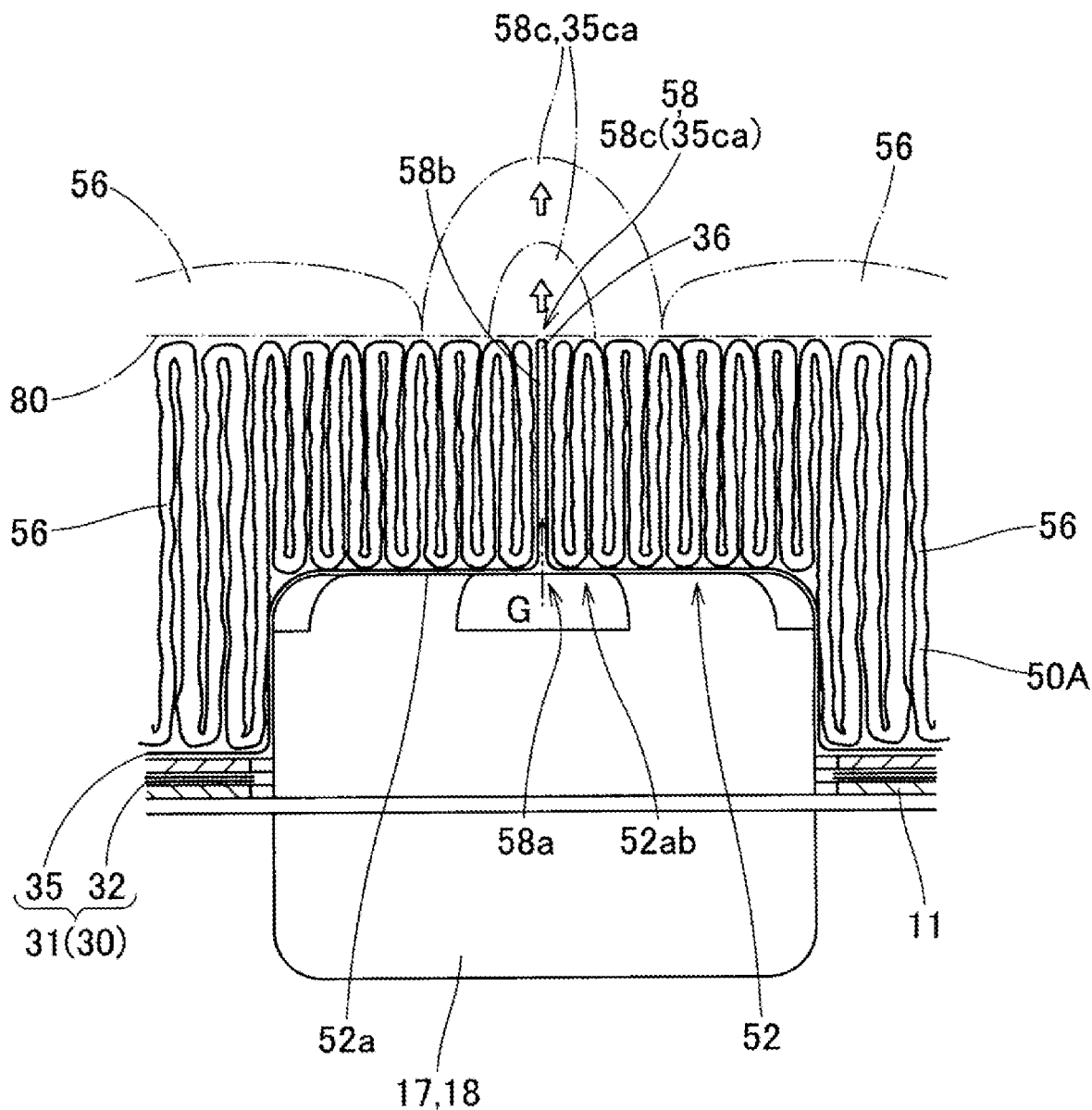
FIG. 20 is a schematic longitudinal cross-sectional view illustrating a linear supply path in the completely folded body of an airbag according to the second embodiment.

Even with such a completely folded body 50A, at the initial stage of the inflow of the inflation gas G, as indicated by the two-dot chain line in FIG. 20, the accommodation recess portion 52 is filled with the inflation gas G. Further, when pressing the inner peripheral surface (ceiling surface 52a or side surface 52b) of the accommodation recess portion 52, some inflation gas G flows quickly and linearly from the base portion 58a of the linear supply path 58A, through the intermediate portion 58b, to the tip portion 58c and reaches the inner surface 36 near the center 35ca of the receiving side wall portion 35 where the tip portion 58c is located, and thus the area near the center 35ca of the receiving side wall portion 35 is quickly pushed up and promptly deployed. In addition, the portion 52ab around the linear supply path 58A on the ceiling surface 52a of the accommodation recess portion 52, that is, the radially-folded folded portion 56, is also pushed up by the inflation gas G. As a result, the portion is quickly protruded from the accommodation portion (bag holder) 11 of the completely folded body 50A and can be deployed while eliminating folding.

Figure 21A:
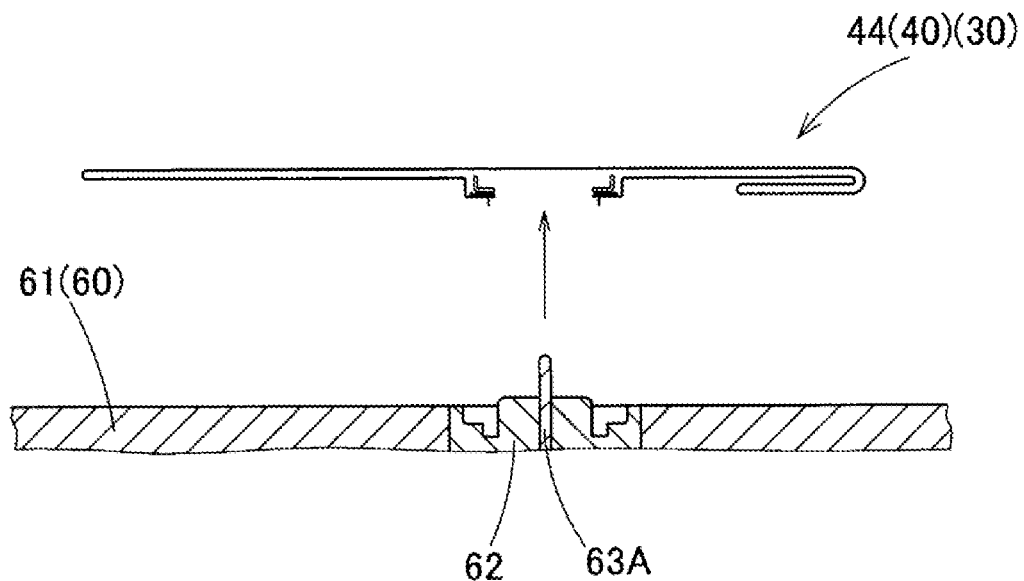
FIGS. 21A to 21C are schematic cross-sectional views illustrating radial folding in a folding step of the airbag according to the second embodiment.
Figure 21B:
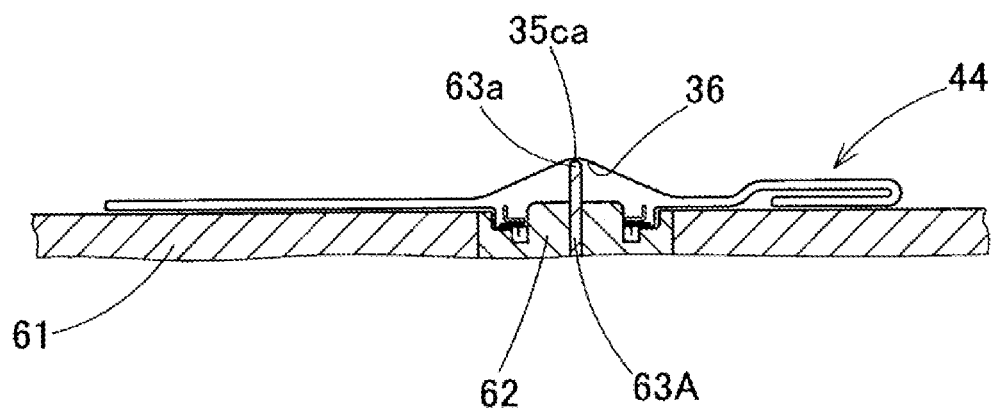
Figure 21C:
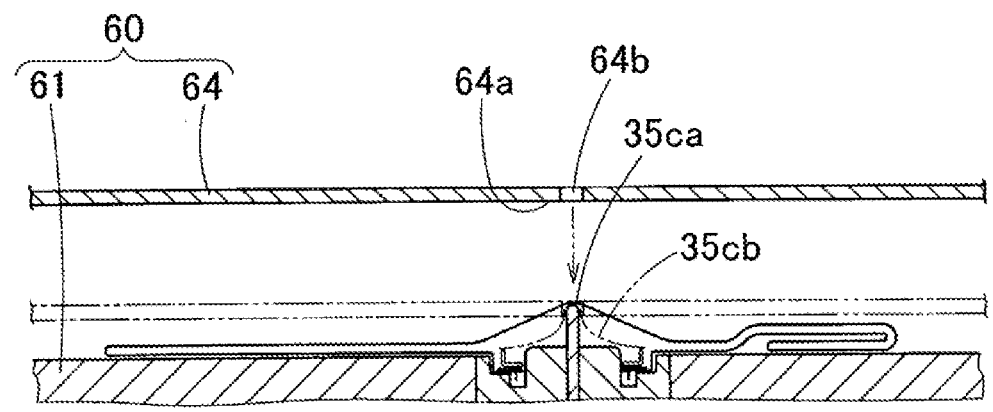

In the folding method according to the second embodiment, as illustrated in FIGS. 21A to 21C, the completely folded body 50A of the airbag 30 is formed by the similar folding step as in the first embodiment except that the upward protrusion amount of a rod member 63A which pushes up portion near the center 35ca of the receiving side wall portion 35 from the set portion 62 is smaller than that of the first embodiment.

In the first and second embodiments, the cylindrical rod members 63 and 63A are used. However, a linear supply path may be formed using a rod member having a non-circular cross section such as a square or a triangle. For example, a linear supply path may be formed using a rod member with a rectangular or elliptical cross section which is long in the front-rear direction. At the initial stage of inflow of the inflation gas, a push-up area near the center 35ca of the receiving side wall portion 35 may be configured as a region which is long in the front-rear direction. In addition, a linear supply path may be formed using a rod member with a rectangular or elliptical cross section which is long in the right-left direction. At the initial stage of inflow of the inflation gas, the push-up area near the center 35ca of the receiving side wall portion 35 may be configured as a region which is long in the right-left direction.

Further, the plate-like portion 58d formed in the tip portion 58c of the linear supply path 58, instead of having a disk shape as in the first embodiment, has a rectangular or elliptical shape which is long in the front-rear direction, has a rectangular or elliptical shape which is long in the right-left direction, or is a plate-like portion which extends from the intermediate portion 58b in one direction of the front, rear, right, and left directions, and at the initial stage of inflow of the inflation gas, the push-up area near the center 35ca of the receiving side wall portion 35 may be adjusted according to the shape of the plate-like portion.

Furthermore, in each embodiment, the base portion 58a of the linear supply paths 58 or 58A is disposed at the center (in other words, the center of the inflow opening 33 or the center of the upper portion 18b of the main body portion 18 of the inflator 17) of the ceiling surface 52a as the center 52ac of the ceiling surface 52a of the accommodation recess portion 52. However, at the initial stage of inflow of the inflation gas, when the vicinity of the center 35ca of the receiving side wall portion 35 in the airbag 30 can be quickly deployed, in the area near the center 52ac of the ceiling surface 52a and displaced from the center of the center 52ac, the base portion 58a may be disposed. Furthermore, also in the tip portion 58c of the linear supply path 58 or 58A, when the vicinity of the center 35ca of the receiving side wall portion 35 can be deployed quickly at the initial stage of inflow of the inflation gas, the tip portion 58c may be disposed in a region near the center 35ca of the receiving side wall portion 35 and displaced from the center of the center 35ca of the receiving side wall portion 35.

In each of the embodiments, the completely folded bodies 50 and 50A are illustrated as having a substantially cylindrical shape. However, the completely folded body may be folded into a polygonal pillar shape such as a square pillar shape.

In each embodiment, when the airbag 30 is radially folded, the outer peripheral edge 45 of the initial deployed body (folding preparation body) 44 is radially folded so as to be pushed into the upper side of the inflow opening 33 from the substantially rectangular parallelepiped or triangular prismatic pushing jigs 66 and 67 radially arranged around the inflow opening 33. However, the pushing jig may be formed of a rod-like member radially arranged around the inflow opening 33. Alternatively, when gathering the outer peripheral edge 45 of the initial deployed body (folding preparation body) 44 above the inflow opening 33, by using suction means such that a nozzle or the like of the suction means is disposed in the initial deployed body 44 from the inflow opening 33 side, then suction is performed, and the outer peripheral edge 45 of the initial deployed body (folding preparation body) 44 is gathered above the inflow opening 33, the airbag 30 (initial deployed body 44) may be radially folded. Immediately before the suction by the suction means, in order to easily suck the outer peripheral edge 45 side, air is allowed to flow between the vehicle body side wall portion 32 and the receiving side wall portion 35 which are superimposed and is flatly deployed. Then, after providing a suction space between the vehicle body side wall portion 32 and the receiving side wall portion 35, the outer peripheral edge 45 side may be sucked.

Furthermore, in each embodiment, the airbag devices 10 and 10A for the driver's seat mounted on the boss B of the steering wheel W are exemplified. However, the invention may be applied to an airbag device for a passenger seat or the like as long as the airbag device uses a completely folded body in which the airbag is radially folded.

What is claimed is:

1. A completely folded body of an airbag, comprising:
    an outer peripheral wall including a vehicle body side wall portion with an inflow opening of inflation gas, and a receiving side wall portion which is connected to an outer peripheral edge of the vehicle body side wall portion, is disposed so as to cover the inflow opening, and receives a person to be protected, wherein:
    an outer peripheral edge side in a state where the receiving side wall portion is superimposed on the vehicle body side wall portion and is flatly deployed is subjected to radial folding to be gathered above the inflow opening and folded;
    an accommodation recess portion for accommodating an upper portion on a gas supply port side of an inflator which supplies inflation gas is provided near a center of a bottom surface;
    a linear supply path which is linearly extended from a vicinity of a center of a ceiling surface of the accommodation recess portion to an inner surface near a center of the receiving side wall portion disposed on an upper surface side and is capable of supplying the inflation gas from the inflator to the inner surface near the center of the receiving side wall portion is formed; and
    a radially-folded folded portion is disposed so as to cover a lateral side and an upper side around the accommodation recess portion and is disposed so as to surround a circumference of an intermediate portion from a base portion near the center of the ceiling surface of the accommodation recess portion in the linear supply path to a tip portion disposed on an inner surface side near the center of the receiving side wall portion.

2. The completely folded body of an airbag according to claim 1, wherein:
    a fold portion, which is formed by folding a peripheral edge near the center of the receiving side wall portion below a portion near the center of the receiving side wall portion and toward the intermediate portion side of the linear supply path, is disposed in a vicinity of the center on an upper surface side; and
    a tip portion of the linear supply path is disposed on a surface side of the upper surface as a plate-like portion which is flatly deployed from the intermediate portion toward an upper side of the fold portion.

3. A folding method for a completely folded body of an airbag, wherein:
    an outer peripheral wall of the airbag includes a vehicle body side wall portion with an inflow opening of inflation gas and a receiving side wall portion which is connected to an outer peripheral edge of the vehicle body side wall portion, is disposed so as to cover the inflow opening, and receives a person to be protected;
    in the completely folded body of the airbag, an outer peripheral edge side in a state where the receiving side wall portion is superimposed on the vehicle body side wall portion and is flatly deployed is formed by being folded using radial folding to be gathered above the inflow opening, and an accommodation recess portion is provided near a center of a bottom surface to accommodate an upper part of an inflator which supplies inflation gas on a gas supply port side;
    a linear supply path, which is linearly extended from a vicinity of a center of a ceiling surface of the accommodation recess portion to an inner surface near a center of the receiving side wall portion disposed on an upper surface side and is capable of supplying the inflation gas from the inflator to the inner surface near the center of the receiving side wall portion is provided;
    a radially-folded folded portion is disposed on a lateral side and an upper side around the accommodation recess portion and is disposed so as to surround a circumference of an intermediate portion from a base portion near the center of the ceiling surface of the accommodation recess portion in the linear supply path to a tip portion disposed on an inner surface side near the center of the receiving side wall portion; and
    when performing radial folding,
        the radial folding is performed in a state where a rod member for forming a linear supply path, which lifts the inner surface near the center of the receiving side wall portion, is inserted through the inflow opening, and
        the rod member is pulled out and a trace of pulling out the rod member is formed as the linear supply path.

4. The folding method of a completely folded body of an airbag according to claim 3, wherein
    when radially folding is performed such that an outer peripheral edge side in a state where the receiving side wall portion is superimposed on the vehicle body side wall portion and is flatly deployed is gathered above the inflow opening,
        the radially folding is performed by pushing a large number of pushing jigs radially arranged around the inflow opening into the inflow opening side, and at the time of the pushing-in, sequentially pushing-in a plurality of groups which are displaced in a circumferential direction of the inflow opening, and
        the radially folding is performed by pulling out the rod member for forming a linear supply path which is inserted before pushing-in after pushing-in a pushing jig of a first group of the first time, and then pushing-in a pushing jig of a subsequent group.

* * * * *